United States Patent
Tanaka et al.

(10) Patent No.: US 9,367,135 B2
(45) Date of Patent: Jun. 14, 2016

(54) ELECTRONIC DEVICE

(71) Applicant: NIKON CORPORATION, Tokyo (JP)

(72) Inventors: Mikiya Tanaka, Chigasaki (JP); Yoshitaka Nakajima, Munakata (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 14/242,210

(22) Filed: Apr. 1, 2014

(65) Prior Publication Data

US 2014/0300562 A1 Oct. 9, 2014

Related U.S. Application Data

(63) Continuation of application No. PCT/JP2012/075836, filed on Oct. 4, 2012.

(30) Foreign Application Priority Data

Oct. 4, 2011 (JP) ................................ 2011-220260
Oct. 4, 2011 (JP) ................................ 2011-220261

(51) Int. Cl.
*G06F 3/01* (2006.01)
*G06F 3/041* (2006.01)
*H04M 1/725* (2006.01)

(52) U.S. Cl.
CPC ................ *G06F 3/016* (2013.01); *G06F 3/041* (2013.01); *H04M 1/72522* (2013.01)

(58) Field of Classification Search
CPC ..... G06F 3/041; G06F 3/016; H04M 1/72522
USPC ...................................................... 345/173
See application file for complete search history.

(56) References Cited

U.S. PATENT DOCUMENTS

| | | | |
|---|---|---|---|
| 6,597,378 B1* | 7/2003 | Shiraishi et al. | 715/764 |
| 8,012,020 B2* | 9/2011 | Yamada | 463/34 |
| 8,036,395 B2* | 10/2011 | Nagasaka et al. | 381/61 |
| 2003/0119562 A1* | 6/2003 | Kokubo | 455/566 |
| 2004/0002380 A1* | 1/2004 | Brosnan | A63F 13/10 463/32 |
| 2009/0011831 A1* | 1/2009 | Yamada | A63F 13/10 463/37 |
| 2010/0013761 A1* | 1/2010 | Birnbaum | G06F 1/1613 345/156 |
| 2010/0017759 A1* | 1/2010 | Birnbaum | G06F 1/1613 715/863 |
| 2010/0315364 A1* | 12/2010 | Miyake | 345/173 |

(Continued)

FOREIGN PATENT DOCUMENTS

| | | |
|---|---|---|
| JP | 2001-318751 | 11/2001 |
| JP | 2010-272119 | 12/2010 |

(Continued)

OTHER PUBLICATIONS

PCT International Search Report and Written Opinion of the International Searching Authority dated Dec. 18, 2012 in corresponding International Patent Application No. PCT/JP2012/075836.

(Continued)

*Primary Examiner* — Aneeta Yodichkas
*Assistant Examiner* — Chineyere Wills-Burns
(74) *Attorney, Agent, or Firm* — Staas & Halsey LLP

(57) ABSTRACT

An electronic device includes a detection unit that detects movement of at least a housing; an information generation unit that generates vibration information based on a quantity value of a predetermined managed object item and the movement of the housing which is detected by the detection unit; and a vibration unit that vibrates based on the vibration information.

2 Claims, 14 Drawing Sheets

(56) References Cited

U.S. PATENT DOCUMENTS

2012/0151339 A1* 6/2012 Zhang ................. G06F 3/016
                                                             715/702

FOREIGN PATENT DOCUMENTS

| JP | 2011-528476 | 11/2011 |
| WO | WO 2010/009157 | 1/2010 |

OTHER PUBLICATIONS

Office Action issued by the State Intellectual Property Office of the P.R. of China on Dec. 23, 2015 in corresponding Chinese patent application No. 201280048575.X.

Office Action issued by the Japanese Patent Office on Sep. 8, 2015 in corresponding Japanese patent application No. 2013-537553.

* cited by examiner

FIG. 3A
DETECTION RESULTS-MANAGED OBJECT ITEM CORRESPONDING INFORMATION
(EXAMPLE 1 OF INSTRUCTION ACCOMPANIED BY MOVEMENT OF HOUSING)

| DETECTION RESULT (THE NUMBER OF TIMES SHAKEN HOUSING) | MANAGED OBJECT ITEM |
|---|---|
| 1-5、21-25、… | REMAINING BATTERY CAPACITY |
| 6-10、26-30、… | THE NUMBER OF UNREAD E-MAILS STORED |
| 11-15、31-35、… | IMAGE STORAGE EMPTY CAPACITY |
| 16-20、36-40、… | REMAINING TIME |

FIG. 3B
DETECTION RESULTS-MANAGED OBJECT ITEM CORRESPONDING INFORMATION
(EXAMPLE 2 OF INSTRUCTION ACCOMPANIED BY MOVEMENT OF HOUSING)

| DETECTION RESULT (DIRECTION IN WHICH HOUSING IS SHAKEN) | MANAGED OBJECT ITEM |
|---|---|
| PLANE DIRECTION OF HOUSING AND VERTICAL DIRECTION | REMAINING BATTERY CAPACITY |
| PLANE DIRECTION OF HOUSING AND HORIZONTAL DIRECTION | THE NUMBER OF UNREAD E-MAILS STORED |
| THICKNESS DIRECTION OF HOUSING AND HORIZONTAL DIRECTION | IMAGE STORAGE EMPTY CAPACITY |
| THICKNESS DIRECTION OF HOUSING AND VERTICAL DIRECTION | REMAINING TIME |

FIG. 3C
DETECTION RESULTS-MANAGED OBJECT ITEM CORRESPONDING INFORMATION
(EXAMPLE OF INSTRUCTION UNACCOMPANIED BY MOVEMENT OF HOUSING)

| DETECTION RESULT (THE NUMBER OF TOUCHES TO LATERAL SIDE PORTION) | MANAGED OBJECT ITEM |
|---|---|
| 1、5、9、… | REMAINING BATTERY CAPACITY |
| 2、6、10、… | THE NUMBER OF UNREAD E-MAILS STORED |
| 3、7、11、… | IMAGE STORAGE EMPTY CAPACITY |
| 4、8、12、… | REMAINING TIME |

PLANE DIRECTION OF HOUSING AND VERTICAL DIRECTION

PLANE DIRECTION OF HOUSING AND HORIZONTAL DIRECTION

THICKNESS DIRECTION OF HOUSING AND HORIZONTAL DIRECTION

FIG. 4D

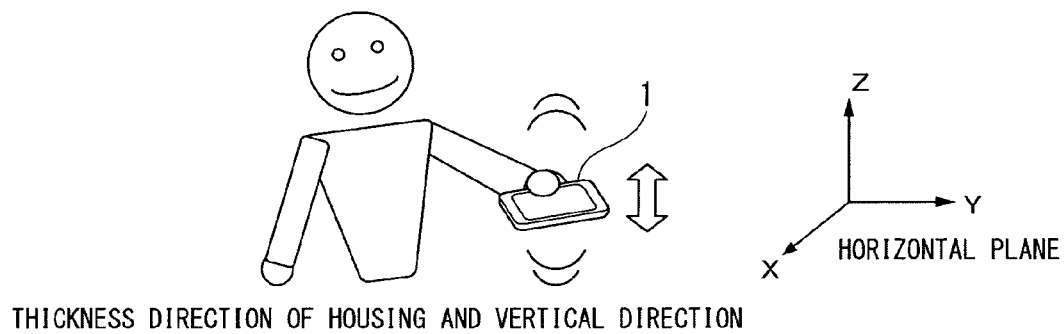

THICKNESS DIRECTION OF HOUSING AND VERTICAL DIRECTION

FIG. 5A

INFORMATION ON VIRTUAL OBJECT (EXAMPLE OF REMAINING BATTERY CAPACITY)

| THE NUMBER OF MANAGED OBJECT ITEMS (REMAINING BATTERY CAPACITY) | THE NUMBER OF VIRTUAL OBJECTS | MATERIAL, SHAPE, AND SIZE OF VIRTUAL OBJECT (MATERIAL AND THE LIKE OF A VIRTUAL OBJECT) |
|---|---|---|
| LESS THAN 20% | 10 | METAL SPHERE (SMALL) |
| 20~50% | 50 | |
| EQUAL TO OR GREATER THAN 50 | 100 | |

FIG. 5B

INFORMATION ON VIRTUAL OBJECT (EXAMPLE OF THE NUMBER OF UNREAD E-MAILS STORED)

| THE NUMBER OF MANAGED OBJECT ITEMS (THE NUMBER OF UNREAD E-MAILS STORED) | THE NUMBER OF VIRTUAL OBJECTS | MATERIAL, SHAPE, AND SIZE OF VIRTUAL OBJECT (MATERIAL AND THE LIKE OF A VIRTUAL OBJECT) |
|---|---|---|
| 0 | 0 | |
| 1 | 1 | PLASTIC CARD (SMALL) |
| TWO OR MORE | 5 | |

FIG. 5C

INFORMATION ON VIRTUAL OBJECT (EXAMPLE OF IMAGE STORAGE EMPTY CAPACITY)

| THE NUMBER OF MANAGED OBJECT ITEMS (IMAGE STORAGE EMPTY CAPACITY) | THE NUMBER OF VIRTUAL OBJECTS | MATERIAL, SHAPE, AND SIZE OF VIRTUAL OBJECT (MATERIAL AND THE LIKE OF A VIRTUAL OBJECT) |
|---|---|---|
| LESS THAN 10% | 10 | |
| 10~50% | 3 | PLASTIC SPHERE (LARGE) |
| EQUAL TO OR GREATER THAN 50% | 1 | |

FIG. 5D

INFORMATION ON VIRTUAL OBJECT (EXAMPLE OF REMAINING TIME)

| THE NUMBER OF MANAGED OBJECT ITEMS (REMAINING TIME (IN MINUTES)) | THE NUMBER OF VIRTUAL OBJECTS | MATERIAL, SHAPE, AND SIZE OF VIRTUAL OBJECT (MATERIAL AND THE LIKE OF A VIRTUAL OBJECT) |
|---|---|---|
| LESS THAN A MINUTES | 5% VOLUME OF CAPACITY OF VIRTUAL CONTAINER | |
| A TO B MINUTES | 20% VOLUME OF CAPACITY OF VIRTUAL CONTAINER | PLASTIC SPHERE (EXTREMELY SMALL) |
| EQUAL TO OR GREATER THAN B MINUTES | 50% VOLUME OF CAPACITY OF VIRTUAL CONTAINER | |

FIG. 6A

COLLISION INFORMATION (DEPENDING ON COLLISION ASPECT)

| COLLISION ASPECT | VIBRATION INFORMATION | SOUND INFORMATION |
|---|---|---|
| COLLISION OF VIRTUAL OBJECT WITH INTERNAL WALL OF VIRTUAL CONTAINER | VIBRATION INFORMATION "X" | — |
| COLLISION OF VIRTUAL OBJECTS WITH EACH OTHER | — | SOUND INFORMATION "Y" |

FIG. 6B

COLLISION INFORMATION
(DEPENDING ON COLLISION ASPECT AND MATERIAL AND THE LIKE OF A VIRTUAL OBJECT)

| COLLISION ASPECT | MATERIAL AND THE LIKE OF A VIRTUAL OBJECT | VIBRATION INFORMATION | SOUND INFORMATION |
|---|---|---|---|
| COLLISION OF VIRTUAL OBJECT WITH INTERNAL WALL OF VIRTUAL CONTAINER | METAL SPHERE (SMALL) | VIBRATION INFORMATION "$X_1$" | — |
| | PLASTIC CARD (SMALL) | VIBRATION INFORMATION "$X_2$" | — |
| | PLASTIC SPHERE (LARGE) | VIBRATION INFORMATION "$X_3$" | — |
| | PLASTIC SPHERE (EXTREMELY SMALL) | VIBRATION INFORMATION "$X_4$" | — |
| COLLISION OF VIRTUAL OBJECTS WITH EACH OTHER | METAL SPHERE (SMALL) | — | SOUND INFORMATION "$Y_1$" |
| | PLASTIC CARD (SMALL) | — | SOUND INFORMATION "$Y_2$" |
| | PLASTIC SPHERE (LARGE) | — | SOUND INFORMATION "$Y_3$" |
| | PLASTIC SPHERE (EXTREMELY SMALL) | — | SOUND INFORMATION "$Y_4$" |

FIG. 7

COLLISION INFORMATION
(DEPENDING ON COLLISION ASPECT, MATERIAL AND THE LIKE OF A VIRTUAL OBJECT,
AND MATERIAL AND THE LIKE OF A VIRTUAL CONTAINER)

| COLLISION ASPECT | MATERIAL AND THE LIKE OF A VIRTUAL OBJECT | MATERIAL AND THE LIKE OF A VIRTUAL CONTAINER | VIBRATION INFORMATION | SOUND INFORMATION |
|---|---|---|---|---|
| COLLISION OF VIRTUAL OBJECT WITH INTERNAL WALL OF VIRTUAL CONTAINER | METAL SPHERE (SMALL) | PLASTIC BOX (MEDIUM) | VIBRATION INFORMATION "$X_{11}$" | — |
| | | PLASTIC BOX (LARGE) | VIBRATION INFORMATION "$X_{12}$" | — |
| | | METAL BOX (MEDIUM) | VIBRATION INFORMATION "$X_{13}$" | — |
| | PLASTIC CARD (SMALL) | PLASTIC BOX (MEDIUM) | VIBRATION INFORMATION "$X_{21}$" | — |
| | | PLASTIC BOX (LARGE) | VIBRATION INFORMATION "$X_{22}$" | — |
| | | METAL BOX (MEDIUM) | VIBRATION INFORMATION "$X_{23}$" | — |
| | PLASTIC SPHERE (LARGE) | PLASTIC BOX (MEDIUM) | VIBRATION INFORMATION "$X_{31}$" | — |
| | | PLASTIC BOX (LARGE) | VIBRATION INFORMATION "$X_{32}$" | — |
| | | METAL BOX (MEDIUM) | VIBRATION INFORMATION "$X_{33}$" | — |
| | PLASTIC SPHERE (EXTREMELY SMALL) | PLASTIC BOX (MEDIUM) | VIBRATION INFORMATION "$X_{41}$" | — |
| | | PLASTIC BOX (LARGE) | VIBRATION INFORMATION "$X_{42}$" | — |
| | | METAL BOX (MEDIUM) | VIBRATION INFORMATION "$X_{43}$" | — |
| COLLISION OF VIRTUAL OBJECTS WITH EACH OTHER | METAL SPHERE (SMALL) | ARBITRARY | — | SOUND INFORMATION "$Y_1$" |
| | PLASTIC CARD (SMALL) | ARBITRARY | — | SOUND INFORMATION "$Y_2$" |
| | PLASTIC SPHERE (LARGE) | ARBITRARY | — | SOUND INFORMATION "$Y_3$" |
| | PLASTIC SPHERE (EXTREMELY SMALL) | ARBITRARY | — | SOUND INFORMATION "$Y_4$" |

FIG. 8
COLLISION INFORMATION
(DEPENDING ON COLLISION ASPECT, MATERIAL AND THE LIKE OF A VIRTUAL OBJECT, AND COLLISION SPEED)

| COLLISION ASPECT | MATERIAL AND THE LIKE OF A VIRTUAL OBJECT | COLLISION SPEED | VIBRATION INFORMATION | SOUND INFORMATION |
|---|---|---|---|---|
| COLLISION OF VIRTUAL OBJECT WITH INTERNAL WALL OF VIRTUAL CONTAINER | METAL SPHERE (SMALL) | LESS THAN $S_A1$ | VIBRATION INFORMATION "$X_1$-1" | — |
| | | $S_A1 \sim S_A2$ | VIBRATION INFORMATION "$X_1$-2" | — |
| | | EQUAL TO OR GREATER THAN $S_A2$ | VIBRATION INFORMATION "$X_1$-3" | — |
| | PLASTIC CARD (SMALL) | LESS THAN $S_A1$ | VIBRATION INFORMATION "$X_2$-1" | — |
| | | $S_A1 \sim S_A2$ | VIBRATION INFORMATION "$X_2$-2" | — |
| | | EQUAL TO OR GREATER THAN $S_A2$ | VIBRATION INFORMATION "$X_2$-3" | — |
| | PLASTIC SPHERE (LARGE) | LESS THAN $S_A1$ | VIBRATION INFORMATION "$X_3$-1" | — |
| | | $S_A1 \sim S_A2$ | VIBRATION INFORMATION "$X_3$-2" | — |
| | | EQUAL TO OR GREATER THAN $S_A2$ | VIBRATION INFORMATION "$X_3$-3" | — |
| | PLASTIC SPHERE (EXTREMELY SMALL) | LESS THAN $S_A1$ | VIBRATION INFORMATION "$X_4$-1" | — |
| | | $S_A1 \sim S_A2$ | VIBRATION INFORMATION "$X_4$-2" | — |
| | | EQUAL TO OR GREATER THAN $S_A2$ | VIBRATION INFORMATION "$X_4$-3" | — |
| COLLISION OF VIRTUAL OBJECTS WITH EACH OTHER | METAL SPHERE (SMALL) | LESS THAN $S_B1$ | — | SOUND INFORMATION "$Y_1$-1" |
| | | $S_B1 \sim S_B2$ | — | SOUND INFORMATION "$Y_1$-2" |
| | | EQUAL TO OR GREATER THAN $S_B2$ | — | SOUND INFORMATION "$Y_1$-3" |
| | PLASTIC CARD (SMALL) | LESS THAN $S_B1$ | — | SOUND INFORMATION "$Y_2$-1" |
| | | $S_B1 \sim S_B2$ | — | SOUND INFORMATION "$Y_2$-2" |
| | | EQUAL TO OR GREATER THAN $S_B2$ | — | SOUND INFORMATION "$Y_2$-3" |
| | PLASTIC SPHERE (LARGE) | LESS THAN $S_B1$ | — | SOUND INFORMATION "$Y_3$-1" |
| | | $S_B1 \sim S_B2$ | — | SOUND INFORMATION "$Y_3$-2" |
| | | EQUAL TO OR GREATER THAN $S_B2$ | — | SOUND INFORMATION "$Y_3$-3" |
| | PLASTIC SPHERE (EXTREMELY SMALL) | LESS THAN $S_B1$ | — | SOUND INFORMATION "$Y_4$-1" |
| | | $S_B1 \sim S_B2$ | — | SOUND INFORMATION "$Y_4$-2" |
| | | EQUAL TO OR GREATER THAN $S_B2$ | — | SOUND INFORMATION "$Y_4$-3" |

FIG. 9

COLLISION INFORMATION
(DEPENDING ON COLLISION ASPECT, MATERIAL AND THE LIKE OF A VIRTUAL OBJECT, MATERIAL AND THE LIKE OF A VIRTUAL CONTAINER, AND COLLISION SPEED)

| COLLISION ASPECT | MATERIAL AND THE LIKE OF A VIRTUAL OBJECT | MATERIAL AND THE LIKE OF A VIRTUAL CONTAINER | COLLISION SPEED | VIBRATION INFORMATION | SOUND INFORMATION |
|---|---|---|---|---|---|
| COLLISION OF VIRTUAL OBJECT WITH INTERNAL WALL OF VIRTUAL CONTAINER | METAL SPHERE (SMALL) | PLASTIC BOX (MEDIUM) | LESS THAN $S_A1$ | VIBRATION INFORMATION "$X_{11}$-1" | — |
| | | | $S_A1 \sim S_A2$ | VIBRATION INFORMATION "$X_{11}$-2" | — |
| | | | EQUAL TO OR GREATER THAN $S_A2$ | VIBRATION INFORMATION "$X_{11}$-3" | — |
| | | PLASTIC BOX (LARGE) | LESS THAN $S_A1$ | VIBRATION INFORMATION "$X_{12}$-1" | — |
| | | | $S_A1 \sim S_A2$ | VIBRATION INFORMATION "$X_{12}$-2" | — |
| | | | EQUAL TO OR GREATER THAN $S_A2$ | VIBRATION INFORMATION "$X_{12}$-3" | — |
| | | METAL BOX (MEDIUM) | LESS THAN $S_A1$ | VIBRATION INFORMATION "$X_{13}$-1" | — |
| | | | $S_A1 \sim S_A2$ | VIBRATION INFORMATION "$X_{13}$-2" | — |
| | | | EQUAL TO OR GREATER THAN $S_A2$ | VIBRATION INFORMATION "$X_{13}$-3" | — |
| | ... | ... | ... | ... | ... |
| COLLISION OF VIRTUAL OBJECTS WITH EACH OTHER | METAL SPHERE (SMALL) | ARBITRARY | LESS THAN $S_B1$ | — | SOUND INFORMATION "$Y_1$-1" |
| | | | $S_B1 \sim S_B2$ | — | SOUND INFORMATION "$Y_1$-2" |
| | | | EQUAL TO OR GREATER THAN $S_B2$ | — | SOUND INFORMATION "$Y_1$-3" |
| | ... | | ... | | ... |

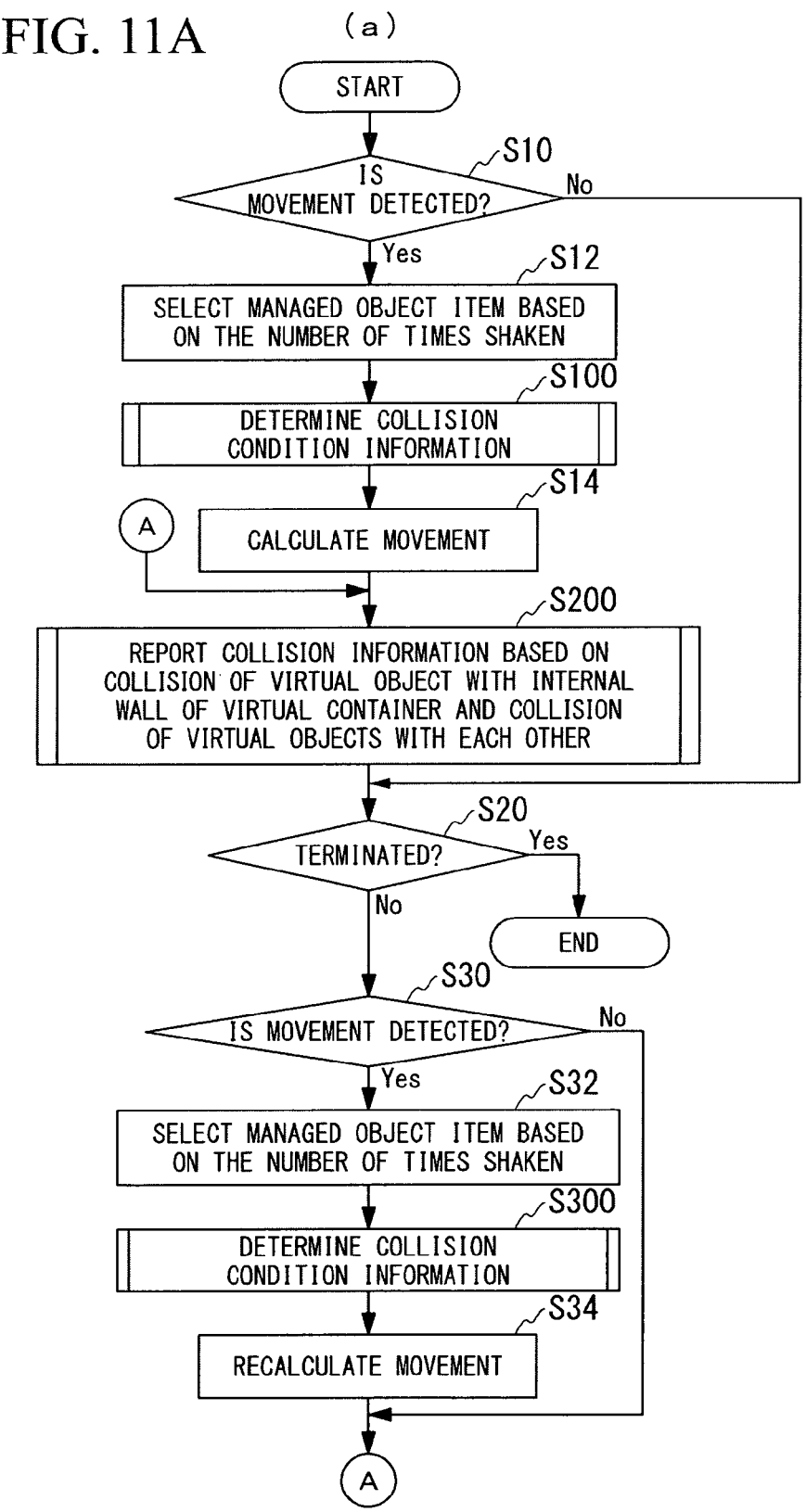

ELECTRONIC DEVICE

CROSS-REFERENCE TO RELATED APPLICATION

This is a Continuation application of International Application No. PCT/JP2012/075836, filed on Oct. 4, 2012, which claims priority to Japanese Patent Application No. 2011-220260, filed Oct. 4, 2011 and Japanese Patent Application No. 2011-220261, filed Oct. 4, 2011, the contents of which are incorporated herein by reference.

BACKGROUND

1. Field of the Invention

The present invention relates to an electronic device.

2. Description of the Related Art

Hitherto, electronic devices have managed various values that are ascertained by a quantity and displayed a value to be managed or information based on the value to be managed (for example, an icon based on a remaining battery capacity) on a screen (for example, see Japanese Unexamined Patent Application, First Publication No. 2010-272119).

SUMMARY

However, in the related art, there is a problem in that if a user does not view a display screen, the user cannot confirm the value to be managed. An object of an aspect of the present invention is to provide an electronic device that allows a user to easily confirm a value to be managed by the electronic device without depending on the sense of sight.

An electronic device according to an aspect of the present invention includes a detection unit that detects movement of at least a housing; an information generation unit that generates vibration information corresponding to a quantity value of a predetermined managed object item and the movement of the housing which is detected by the detection unit; and a vibration unit that vibrates based on the vibration information.

An electronic device according to an aspect of the present invention includes a detection unit that detects movement of at least a housing; an information generation unit that generates sound information corresponding to a quantity value of a predetermined managed object item and the movement of the housing which is detected by the detection unit; and a sound output unit that outputs a sound based on the sound information.

An electronic device according to an aspect of the present invention includes a detection unit that detects movement of at least a housing; an information generation unit that calculates movement of a virtual container moving in response to the movement of the housing and movement of a virtual object moving inside the virtual container, and generates collision information that indicates a collision occurring due to the virtual object moving inside the housing; a quantity determination unit that determines the number of virtual objects based on a quantity value of a predetermined managed object item; and a reporting unit that reports the collision based on the collision information.

According to an aspect of the present invention, it is possible to provide an electronic device capable of allowing a user to easily confirm a value to be managed by the electronic device without depending on the sense of sight.

BRIEF DESCRIPTION OF THE DRAWINGS

FIG. 3A illustrates an example of information stored in a managed object item storage unit.

FIG. 3B illustrates an example of information stored in a managed object item storage unit.

FIG. 3C illustrates an example of information stored in a managed object item storage unit.

FIG. 4D is a diagram illustrating a direction in which a housing of an electronic device is shaken.

FIG. 5A illustrates an example of information stored in a collision condition information storage unit.

FIG. 5B illustrates an example of information stored in a collision condition information storage unit.

FIG. 5C illustrates an example of information stored in a collision condition information storage unit.

FIG. 5D illustrates an example of information stored in a collision condition information storage unit.

FIG. 6A illustrates an example of information stored in a collision information storage unit.

FIG. 6B illustrates an example of information stored in a collision information storage unit.

FIG. 7 illustrates an example of information stored in a collision information storage unit.

FIG. 8 illustrates an example of information stored in a collision information storage unit.

FIG. 9 illustrates an example of information stored in a collision information storage unit.

FIG. 11A is an example of a flow chart illustrating a flow of the processing of an electronic device.

DESCRIPTION OF THE EMBODIMENTS

Figure 1:
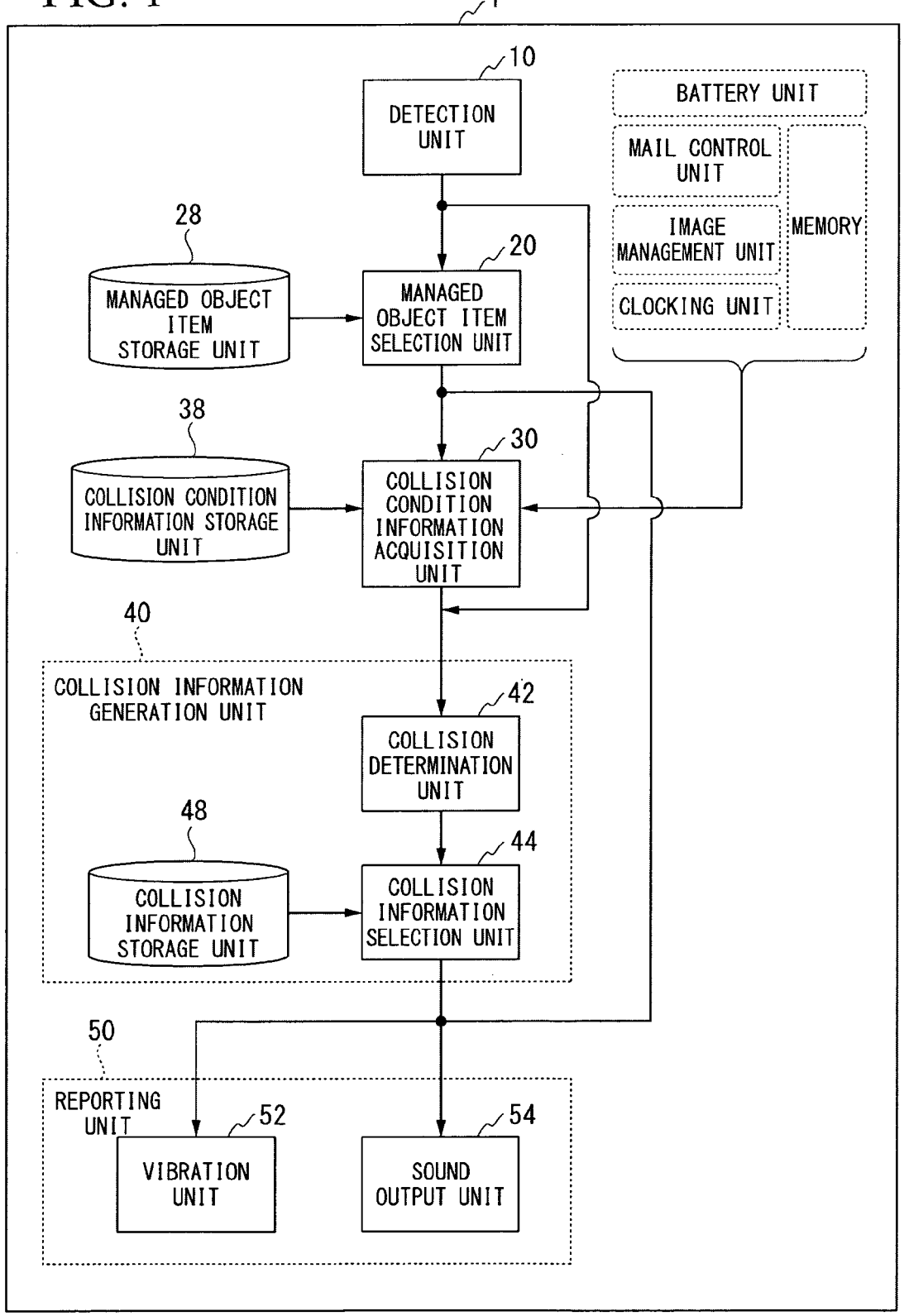
FIG. 1 is an example of a functional block diagram of an electronic device according to an embodiment of the present invention.
Figure 2:
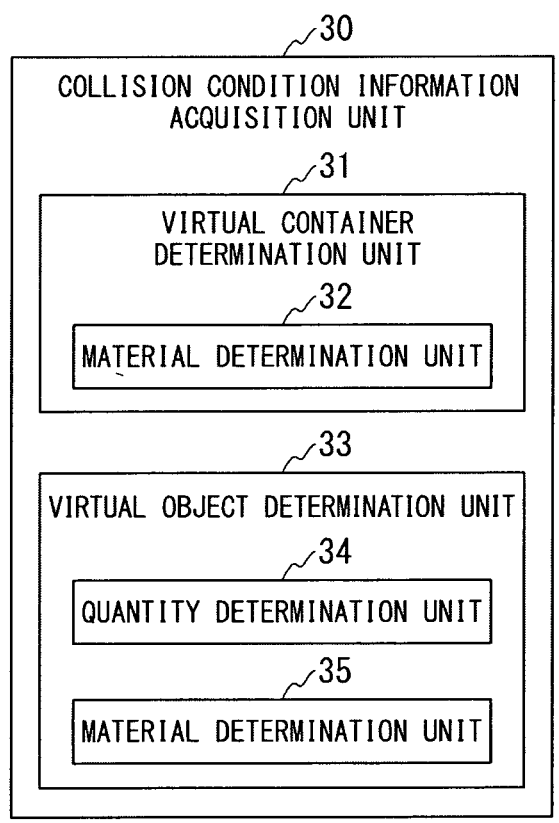
FIG. 2 is an example of a functional block diagram of a collision condition information acquisition unit.
Figure 4A:
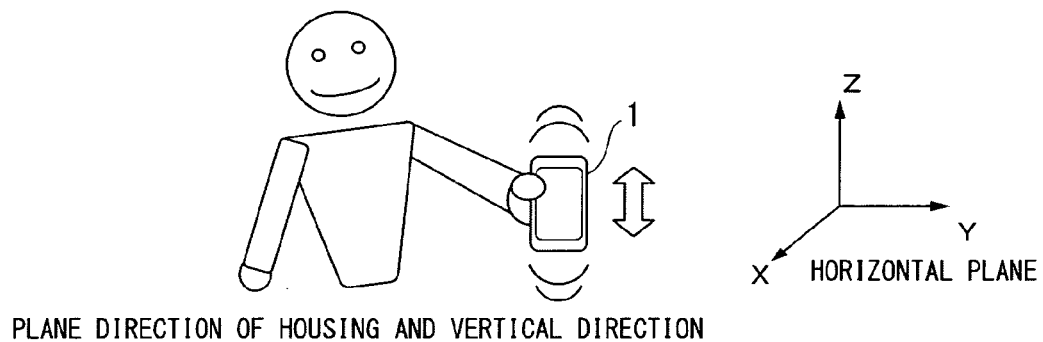
FIG. 4A is a diagram illustrating a direction in which a housing of an electronic device is shaken.
Figure 4B:
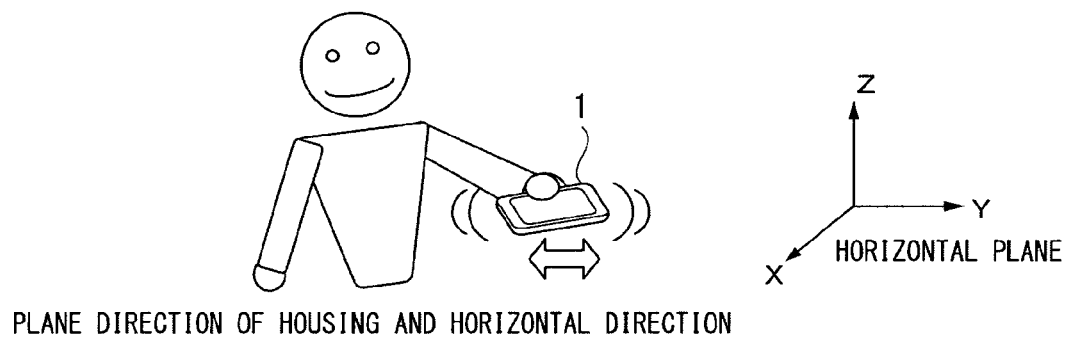
FIG. 4B is a diagram illustrating a direction in which a housing of an electronic device is shaken.
Figure 4C:
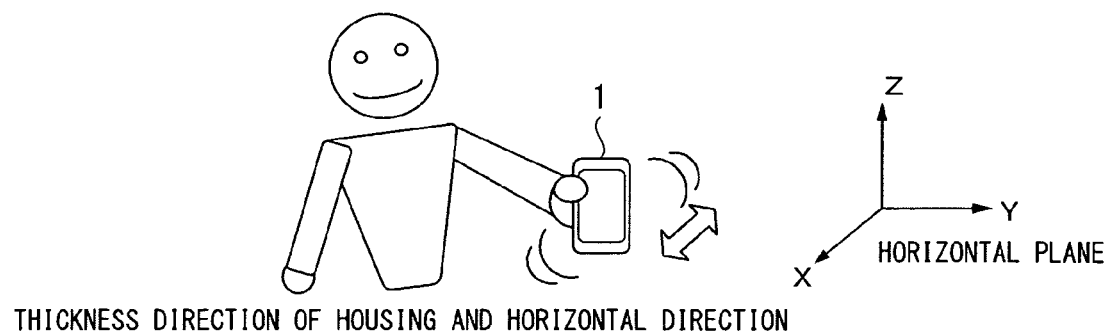
FIG. 4C is a diagram illustrating a direction in which a housing of an electronic device is shaken.

Hereinafter, an embodiment of the present invention will be described with reference to the accompanying drawings. FIG. 1 is an example of a functional block diagram of an electronic device 1 according to an embodiment of the present invention. FIG. 2 is an example of a functional block diagram of a collision condition information acquisition unit 30. FIGS. 3A to 3C illustrate examples of information stored in a managed object item storage unit 28. FIGS. 4A to 4D are diagrams illustrating a direction in which the housing of the electronic device 1 is shaken. FIGS. 5A to 5D illustrate examples of information stored in a collision condition information storage unit 38. FIG. 6A to FIG. 9 illustrate examples of information stored in a collision information storage unit 48.

As illustrated in FIG. 1, the electronic device 1 includes a detection unit 10, a managed object item selection unit 20, the managed object item storage unit 28, the collision condition information acquisition unit 30, the collision condition information storage unit 38, a collision information generation unit 40, and a reporting unit 50. The collision information generation unit 40 includes a collision determination unit 42, a collision information selection unit 44, and a collision information storage unit 48. The reporting unit 50 includes a vibration unit 52 and a sound output unit 54. As illustrated in FIG. 2, the collision condition information acquisition unit 30 includes a virtual container determination unit 31 including a material determination unit 32, and a virtual object determination unit 33 including a quantity determination unit 34 and a material determination unit 35.

In addition, as shown by dashed lines, the electronic device 1 includes a battery unit that supplies power to units, an e-mail control unit that controls an e-mail, an image management unit that manages an image captured by an imaging unit not shown in the drawing, a clocking unit that measures time, a memory that stores various pieces of information (for example, an e-mail, a captured image, and an alarm time), and the like. In addition, the electronic device 1 includes a display unit (not shown) which displays various pieces of information (for example, an operation screen and a captured image).

For example, the vibration unit 52 is a vibration motor, and vibrates the housing of the electronic device 1 (hereinafter, simply referred to as a housing) in accordance with vibration information which is output from the collision information generation unit 40 (specifically, the collision information selection unit 44). In addition, the vibration unit 52 may report a managed object item (to be described later) by vibration (may vibrate the housing using a vibration method which is determined in advance for each managed object item).

For example, the sound output unit 54 is a speaker, and outputs a sound to the outside of the housing in accordance with sound information which is output from the collision information generation unit 40 (specifically, the collision information selection unit 44). In addition, the sound output unit 54 may report a managed object item (to be described later) by a sound.

The detection unit 10 is a sensor constituted by one type or two or more types, and detects a user's instruction to the electronic device 1. The user's instruction to the electronic device 1 includes an instruction made by moving the housing itself through the user's shaking of the housing or the like (hereinafter, referred to as "instruction accompanied by movement of housing"), and an instruction made by touching a predetermined portion of the housing or the like while the user does not move the housing itself (hereinafter, referred to as "instruction unaccompanied by movement of housing").

The detection unit 10 detecting an instruction accompanied by the movement of the housing is an acceleration sensor, for example. The detection unit 10 (acceleration sensor) detects acceleration applied to the housing, and detects the movement of the housing based on the detected acceleration. In other words, when a user shakes the housing as an instruction to the electronic device 1, the detection unit 10 (acceleration sensor) detects movement information of the housing as information on the user's instruction to the electronic device 1. The detection unit 10 (acceleration sensor) outputs detection results (movement information of the housing) to the managed object item selection unit 20 and the collision information generation unit 40 (specifically, the collision determination unit 42).

The detection unit 10 detecting an instruction unaccompanied by the movement of the housing is, for example, a touch sensor which is provided in a lateral side portion of the housing. The detection unit 10 (touch sensor) detects a touch to the lateral side portion. In other words, when a user touches (taps, flicks, slides, or the like) the lateral side portion of the housing as an instruction to the electronic device 1, the detection unit 10 (touch sensor) detects information on the touch to the lateral side portion as information on the user's instruction to the electronic device 1. The detection unit 10 (touch sensor) outputs detection results (touch information) to the managed object item selection unit 20 and the collision information generation unit 40 (specifically, the collision determination unit 42).

The managed object item storage unit 28 stores information on the user's instruction to the electronic device 1 (equivalent to the detection results of the detection unit 10) in association with a managed object item which is managed (stored) by a quantity value (digital) in the electronic device 1. The managed object item is an item managed by a quantity value in the electronic device 1 (for example, a remaining battery capacity, the number of unread e-mails stored, an image storage empty capacity, and a remaining time). The remaining time is a time until an alarm is set. The managed object item storage unit 28 is referred to when the managed object item selection unit 20 selects a managed object item.

Information to be stored in the managed object item storage unit 28 is required to be associated with an operation which is requested from a user when causing the user to select a managed object item. For example, when the managed object item is selected according to the number of times the housing is shaken (an aspect of the instruction accompanied by the movement of the housing), the managed object item storage unit 28 stores detection results (the number of times the housing is shaken which is an instruction accompanied by the movement of the housing) in association with the managed object item as illustrated in FIG. 3A. In addition, for example, when the managed object item is selected according to a direction in which the housing is shaken (an aspect of the instruction accompanied by the movement of the housing), the managed object item storage unit 28 stores detection results (direction in which the housing is shaken which is an instruction accompanied by the movement of the housing) in association with the managed object item as illustrated in FIG. 3B. In addition, for example, when the managed object item is selected according to the number of touches to the lateral side portion of the housing (an aspect of the instruction unaccompanied by the movement of the housing), the managed object item storage unit 28 stores detection results (the number of touches to the lateral side portion which is an instruction unaccompanied by the movement of the housing) in association with the managed object item as illustrated in FIG. 3C.

Meanwhile, in the example illustrated in FIG. 3A, the managed object item storage unit 28 stores the number of times shaken "1-5, 21-25, . . . " in association with a managed object item "remaining battery capacity", stores the number of times shaken "6-10, 26-30, . . . " in association with a managed object item "number of unread e-mails stored", stores the number of times shaken "11-15, 31-35, . . . " in association with a managed object item "image storage empty capacity", and stores the number of times shaken "16-20, 36-40, . . . " in association with a managed object item "remaining time".

In the example illustrated in FIG. 3B, the managed object item storage unit 28 stores a shaking direction "plane direction of housing and vertical direction (see FIG. 4A)" in association with a managed object item "remaining battery capacity", stores a shaking direction "plane direction of housing and horizontal direction (see FIG. 4B)" in association with a managed object item "number of unread e-mails stored", stores a shaking direction "thickness direction of housing and horizontal direction (see FIG. 4C)" in association with a managed object item "image storage empty capacity", and stores a shaking direction "thickness direction of housing and vertical direction (see FIG. 4D)" in association with a managed object item "remaining time".

In the example illustrated in FIG. 3C, the managed object item storage unit 28 stores the number of touches "1, 5, 9, . . . " in association with a managed object item "remaining battery capacity", stores the number of touches "2, 6, 10, . . . " in association with a managed object item "number of unread e-mails stored", stores the number of touches "3, 7, 11, . . . " in association with a managed object item "image storage empty capacity", and stores the number of touches "4, 8, 12, . . . " in association with a managed object item "remaining time".

The managed object item selection unit 20 acquires a detection result (movement information of the housing or touch information) as information on the user's instruction to the electronic device 1, from the detection unit 10. The managed object item selection unit 20 having acquired the detection result (instruction information) selects one managed object item corresponding to the detection result (instruction information) which is acquired from the detection unit 10, with reference to the managed object item storage unit 28. In other words, when the detection unit 10 detects an instruction indicated by instruction information corresponding to a managed object item stored in the managed object item storage unit 28, the managed object item selection unit 20 selects a managed object item corresponding to the instruction.

For example, in a case where the information illustrated in FIG. 3A is stored in the managed object item storage unit 28, when the managed object item selection unit 20 acquires a detection result to the effect of a first shaking, the managed object item selection unit selects the managed object item "remaining battery capacity" corresponding to the detection result "1-5, 21-25, . . . " including "first time".

In addition, for example, in a case where the information illustrated in FIG. 3B is stored in the managed object item storage unit 28, when the managed object item selection unit 20 acquires a detection result to the effect of shaking in "plane direction of housing and vertical direction", the managed object item selection unit selects the managed object item "remaining battery capacity" corresponding to the detection result "plane direction of housing and vertical direction".

In addition, for example, in a case where the information illustrated in FIG. 3C is stored in the managed object item storage unit 28, when the managed object item selection unit 20 acquires a detection result to the effect of a first touch, the managed object item selection unit selects the managed object item "remaining battery capacity" corresponding to the detection result "1, 5, 9 . . . " including "first time".

The managed object item selection unit 20 outputs the selection results to the collision condition information acquisition unit 30. In addition, the managed object item selection unit 20 may output the selection results to the reporting unit 50 in addition to the collision condition information acquisition unit 30.

The collision condition information storage unit 38 stores information on a virtual container that operates in accordance with the movement of the housing (hereinafter, referred to as "virtual container") and information on an object which is virtually present within the virtual container (hereinafter, referred to as "virtual object"), as collision condition information. The virtual object virtually moves around within the virtual container in accordance with the movement of the virtual container. A user may appropriately set and change the collision condition information.

(Information on Virtual Container)

The collision condition information storage unit 38 stores, for example, a material, a shape, and a size of a virtual container (hereinafter, referred to as "material and the like of a virtual container") as information on the virtual container. Meanwhile, the collision condition information storage unit 38 may store the information for each managed object item and may store the information in accordance with a quantity value of each managed object item.

(Information on Virtual Object)

The collision condition information storage unit 38 stores a quantity value of a managed object item, the number of virtual objects, and the material, the shape, and the size of a virtual object (hereinafter, referred to as "material and the like of a virtual object") in association therewith.

Specifically, for example, regarding the remaining battery capacity, as illustrated in FIG. 5A, the collision condition information storage unit 38 stores a remaining battery capacity "less than 20%", the number of virtual objects "10", and the material and the like of a virtual object "metal sphere (small)" in association therewith, stores a remaining battery capacity "20% to 50%", the number of virtual objects "50", and the material and the like of a virtual object "metal sphere (small)" in association therewith, and stores a remaining battery capacity "equal to or greater than 50%", the number of virtual objects "100", and the material and the like of a virtual object "metal sphere (small)" in association therewith. Meanwhile, it is assumed that a specific numerical value of the "metal sphere (small)" is stored in the collision condition information storage unit 38 (not shown).

In addition, regarding the number of unread e-mails stored, as illustrated in FIG. 5B, the collision condition information storage unit 38 stores the number of unread e-mails stored "0", the number of virtual objects "0", and a material and the like of a virtual object "plastic card (small)" in association therewith, stores the number of unread e-mails stored "1", the number of virtual objects "1", and the material and the like of a virtual object "plastic card (small)" in association therewith, and stores the number of unread e-mails stored "equal to or more than 2", the number of virtual objects "5", and the material and the like of a virtual object "plastic card (small)" in association therewith. Meanwhile, it is assumed that a specific numerical value of the "plastic card (small)" is stored in the collision condition information storage unit 38 (not shown).

In addition, regarding the image storage empty capacity, as illustrated in FIG. 5C, the collision condition information storage unit 38 stores an image storage empty capacity "less than 10%", the number of virtual objects "10", and the material and the like of a virtual object "plastic sphere (large)" in association therewith, stores an image storage empty capacity "10% to 50%", the number of virtual objects "3", and the material and the like of a virtual object "plastic sphere (large)" in association therewith, and stores an image storage empty capacity "equal to or greater than 50%", the number of virtual objects "1", and the material and the like of a virtual object "plastic sphere (large)" in association therewith. Meanwhile, it is assumed that a specific numerical value of the "plastic sphere (large)" is stored in the collision condition information storage unit 38 (not shown).

In addition, regarding the remaining time, as illustrated in FIG. 5D, the collision condition information storage unit 38 stores a remaining time "less than A minutes", the number of virtual objects "5% volume of capacity of virtual container", and a material and the like of a virtual object "plastic sphere (extremely small)" in association therewith, stores a remaining time "A to B minutes", the number of virtual objects "20% volume of capacity of virtual container", and the material and the like of a virtual object "plastic sphere (extremely small)" in association therewith, and stores a remaining time "equal to or greater than B minutes", the number of virtual objects "50% volume of capacity of virtual container", and the material and the like of a virtual object "plastic sphere (extremely small)" in association therewith. Meanwhile, it is assumed that a specific numerical value of the "plastic sphere (extremely small)" is stored in the collision condition information storage unit 38 (not shown).

Meanwhile, in the examples illustrated in FIGS. 5A to 5D, the collision condition information storage unit 38 stores a material and the like of a virtual object which is different for each managed object item, but may store the same material and the like of a virtual object regardless of a managed object item. In the examples illustrated in FIGS. 5A to 5D, the collision condition information storage unit 38 stores the same material and the like of a virtual object regardless of a quantity value of a managed object item in each managed object item, but may store a material and the like of a virtual object which is different for each quantity value of a managed object item in each managed object item.

The collision condition information acquisition unit 30 acquires a selection result of a managed object item from the managed object item selection unit 20. When the collision condition information acquisition unit 30 acquires the selection result from the managed object item selection unit 20, the collision condition information acquisition unit acquires collision condition information with reference to the collision condition information storage unit 38.

(Acquisition of Information on Virtual Container)

The material determination unit 32 of the collision condition information acquisition unit 30 determines a material and the like of a virtual container among pieces of collision condition information to be output to the collision determination unit 42 with reference to the collision condition information storage unit 38, and reads out and acquires the determined material and the like of a virtual container (information indicating a material and the like) from the collision condition information storage unit 38.

Specifically, when one material and the like of a virtual container is stored in the collision condition information storage unit 38 regardless of a managed object item, the material determination unit 32 reads out and acquires the material and the like of a virtual container from the collision condition information storage unit 38.

Meanwhile, when a material and the like of a virtual container is stored for each managed object item in the collision condition information storage unit 38, the material determination unit 32 reads out and acquires a material and the like of a virtual container based on the managed object item indicated by the selection result acquired from the managed object item selection unit 20, from the collision condition information storage unit 38. For example, when the material determination unit 32 acquires, from the managed object item selection unit 20, a selection result to the effect that the managed object item "remaining battery capacity" is selected, the material determination unit reads out and acquires the material and the like of a virtual container which corresponds to the managed object item "remaining battery capacity" from the collision condition information storage unit 38.

In addition, a material and the like of a virtual container is stored for each number of managed object items in the collision condition information storage unit 38, and the material determination unit 32 reads out and acquires a material and the like of a virtual container based on the quantity value of the managed object item indicated by the selection result acquired from the managed object item selection unit 20, from the collision condition information storage unit 38. For example, when the material determination unit 32 acquires, from the managed object item selection unit 20, a selection result to the effect that the managed object item "remaining battery capacity" is selected, the material determination unit acquires a remaining battery capacity value with reference to the battery unit, and reads out and acquires the number of virtual objects and the material and the like of a virtual object which correspond to the remaining battery capacity from the collision condition information storage unit 38.

(Acquisition of Information on Virtual Object)

The quantity determination unit 34 of the collision condition information acquisition unit 30 determines the number of virtual objects among the pieces of collision condition information to be output to the collision determination unit 42 with reference to the collision condition information storage unit 38, and reads out and acquires the determined number of virtual objects from the collision condition information storage unit 38. In more detail, the quantity determination unit 34 reads out and acquires the number of virtual objects based on the quantity value of the managed object item indicated by the selection result acquired from the managed object item selection unit 20, from the collision condition information storage unit 38.

Specifically, when the quantity determination unit 34 acquires, from the managed object item selection unit 20, a selection result to the effect that the managed object item "remaining battery capacity" is selected, the quantity determination unit acquires a remaining battery capacity value with reference to the battery unit, and reads out and acquires the number of virtual objects corresponding to the remaining battery capacity from the collision condition information storage unit 38. For example, in a case of a remaining battery capacity "30%", the quantity determination unit 34 reads out and acquires the number of virtual objects "50" corresponding to the remaining battery capacity "20% to 50%" including the remaining battery capacity "30%" from the collision condition information storage unit 38 as illustrated in FIG. 5A.

In addition, when the quantity determination unit 34 acquires, from the managed object item selection unit 20, a selection result to the effect that the managed object item "the number of unread e-mails stored" is selected, the quantity determination unit acquires the number of unread e-mails stored with reference to the mail control unit (or the memory), and reads out and acquires the number of virtual objects corresponding to the number of unread e-mails stored from the collision condition information storage unit 38. For example, in a case of the number of unread e-mails stored "1", the quantity determination unit 34 reads out and acquires the number of virtual objects "1" corresponding to the number of unread e-mails stored "1" from the collision condition information storage unit 38 as illustrated in FIG. 5B.

In addition, when the quantity determination unit 34 acquires, from the managed object item selection unit 20, a selection result to the effect that the managed object item "image storage empty capacity" is selected, the quantity determination unit acquires an image storage empty capacity with reference to the image management unit (or the memory), and reads out and acquires the number of virtual objects corresponding to the image storage empty capacity from the collision condition information storage unit 38. For example, in a case of an image storage empty capacity "30%", the quantity determination unit 34 reads out and acquires the number of virtual objects "3" corresponding to a remaining battery capacity "10% to 50%" including the image storage empty capacity "30%" from the collision condition information storage unit 38 as illustrated in FIG. 5C.

In addition, when the quantity determination unit 34 acquires, from the managed object item selection unit 20, a selection result to the effect that the managed object item "remaining time" is selected, the quantity determination unit acquires a remaining time with reference to the clocking unit and the memory, and reads out and acquires the number of virtual objects corresponding to the remaining time from the collision condition information storage unit 38. For example, as illustrated in FIG. 5D, in a case where a remaining time "T (minutes)" is (A<T<B), the quantity determination unit 34 reads out and acquires the number of virtual objects "20% volume of capacity of virtual container" which corresponds to the remaining time "A to B minutes" including the remaining time "T minutes", from the collision condition information storage unit 38. Meanwhile, the number of plastic spheres (extremely small) of the 20% volume of capacity of virtual container is calculated based on the material and the like of a virtual container which is determined in advance.

The material determination unit 35 of the collision condition information acquisition unit 30 determines a material and the like of a virtual object among pieces of the collision condition information to be output to the collision determination unit 42, with reference to the collision condition information storage unit 38, and reads out and acquires the determined material and the like of a virtual object (information indicating a material and the like) from the collision condition information storage unit 38.

For example, when a material and the like of a virtual object is stored for each managed object item in the collision condition information storage unit 38, the material determination unit 35 reads out and acquires a material and the like of a virtual container based on the managed object item indicated by the selection result acquired from the managed object item selection unit 20, from the collision condition information storage unit 38.

Specifically, when the material determination unit 35 acquires, from the managed object item selection unit 20, a selection result to the effect that the managed object item "remaining battery capacity" is selected, the material determination unit reads out and acquires the material and the like of a virtual object "metal sphere (small)" which corresponds to the managed object item "remaining battery capacity" from the collision condition information storage unit 38 as illustrated in FIG. 5A. In addition, when the material determination unit 35 acquires, from the managed object item selection unit 20, a selection result to the effect that the managed object item "number of unread e-mails stored" is selected, the material determination unit reads out and acquires the material and the like of a virtual object "plastic card (small)" which corresponds to the managed object item "the number of unread e-mails stored" from the collision condition information storage unit 38 as illustrated in FIG. 5B. In addition, when the material determination unit 35 acquires, from the managed object item selection unit 20, a selection result to the effect that the managed object item "image storage empty capacity" is selected, the material determination unit reads out and acquires the material and the like of a virtual object "plastic sphere (large)" which corresponds to the managed object item "image storage empty capacity" from the collision condition information storage unit 38 as illustrated in FIG. 5C. In addition, when the material determination unit 35 acquires, from the managed object item selection unit 20, a selection result to the effect that the managed object item "remaining time" is selected, the material determination unit reads out and acquires the material and the like of a virtual object "plastic sphere (extremely small)" which corresponds to the managed object item "remaining time" from the collision condition information storage unit 38 as illustrated in FIG. 5D.

The collision condition information acquisition unit 30 outputs the collision condition information (material and the like of a virtual container, the number of virtual objects, and material and the like of a virtual object) which is read out from the collision condition information storage unit 38 to the collision information generation unit 40 (specifically, the collision determination unit 42).

The collision information generation unit 40 generates collision information indicating a collision of a virtual object with an internal wall of a virtual container and a collision of virtual objects with each other, based on the collision condition information acquired from the collision condition information acquisition unit 30. In other words, the collision information generation unit 40 generates collision information indicating a collision of the virtual object with the internal wall of the housing (virtual container) and a collision of the virtual objects with each other which occur by the virtual objects, having the number determined by the quantity determination unit 34, virtually moving inside the housing in accordance with the movement of the housing which is detected by the detection unit 10. The collision information generation unit 40 generates parameter information (various parameters regarding virtual collision (collision element)) based on a virtual collision. Hereinafter, the collision information generation unit 40 will be described in detail.

The collision determination unit 42 is a physical engine that calculates the movement of a virtual container and the movement of a virtual object based on the movement of the housing, which is detected by the detection unit 10, and the collision condition information. Meanwhile, the materials of the virtual container and the virtual object are used for the above-described calculation as a repulsive force and a friction coefficient.

When the collision determination unit 42 acquires a detection result (movement information of the housing) from the detection unit 10, that is, when the detection unit 10 detects an instruction accompanied by the movement of the housing (when the housing is shaken), the collision determination unit calculates the movement of the virtual container and the movement of the virtual object based on the movement of the housing (see FIGS. 11A to 11C to be described later). In a case where the collision determination unit 42 acquires a detection result (touch information) from the detection unit 10, that is, in a case where the detection unit 10 detects an instruction unaccompanied by the movement of the housing (in a case where the lateral side portion is touched), when the detection unit 10 further detects an instruction accompanied by the movement of the housing, the collision determination unit calculates the movement of the virtual container and the movement of the virtual object based on the movement of the housing (see FIG. 12 to be described later). Meanwhile, the collision determination unit 42 may set the movement of the housing as the movement of the virtual container.

In the process of calculating the movement of the virtual container and the movement of the virtual object, the collision determination unit 42 determines the presence or absence of a collision of the virtual object with the internal wall of the virtual container and the presence or absence of a collision of the virtual objects with each other. In other words, the collision determination unit 42 determines a collision, calculates a moving direction and a moving speed of the virtual object after the collision, and calculates the movement of individual virtual objects (that is, generates movement information of individual virtual objects).

The collision determination unit 42 outputs the determination results of the collision (to the effect that there is a collision of the virtual object with the internal wall of the virtual container and the effect that there is a collision of the virtual objects with each other) to the collision information selection unit 44. Meanwhile, when the collision information selection unit 44 outputs collision information depending on the material and the like of a virtual object to the reporting unit 50, the collision determination unit 42 outputs the material and the like of a virtual object (information indicating a material and the like) which is acquired from the collision condition information acquisition unit 30 to the collision information selection unit 44. In addition, when the collision information selection unit 44 outputs collision information depending on a material and the like of a virtual container to the reporting unit 50, the collision determination unit 42 outputs the material and the like of a virtual container (information indicating a material and the like) which is acquired from the collision condition information acquisition unit 30 to the collision information selection unit 44. In addition, when the collision information selection unit 44 outputs collision information depending on a collision speed (speed of a collision of the virtual object with the internal wall of the virtual container and speed of a collision of the virtual objects with each other) to the reporting unit 50, the collision determination unit 42 outputs the collision speed (information indicating speed) which is calculated in the process of determining the collision, to the collision information selection unit 44.

The collision information storage unit 48 stores a collision aspect in association with collision information (vibration information and sound information). The collision information storage unit 48 is referred to when the collision information selection unit 44 selects collision information to be output to the reporting unit 50.

Specifically, as illustrated in FIG. 6A, the collision information storage unit 48 stores vibration information "X" in association with a collision aspect "collision of virtual object with internal wall of virtual container" and stores sound information "Y" in association with a collision aspect "collision of virtual objects with each other". The example illustrated in FIG. 6A is an example in which the collision information depends on only a collision aspect. In other words, when the collision information selection unit 44 outputs collision information depending on only a collision aspect to the reporting unit 50, the information illustrated in FIG. 6A is stored in the collision information storage unit 48.

Meanwhile, instead of the example illustrated in FIG. 6A, the collision information storage unit 48 may store collision information in association with a collision aspect and the material and the like of a virtual object as illustrated in FIG. 6B. The example illustrated in FIG. 6B is an example in which the collision information depends on the collision aspect and the material and the like of a virtual object.

In other words, when the collision information selection unit 44 outputs collision information depending on a collision aspect and the material and the like of a virtual object to the reporting unit 50, the information illustrated in FIG. 6B is stored in the collision information storage unit 48.

In addition, instead of the examples illustrated in FIGS. 6A and 6B, the collision information storage unit 48 may store collision information in association with a collision aspect, the material and the like of a virtual object, and the material and the like of a virtual container as illustrated in FIG. 7.

The example illustrated in FIG. 7 is an example in which the collision information depends on the collision aspect and the materials and the like of virtual object and virtual container. In other words, when the collision information selection unit 44 outputs collision information depending on a collision aspect and materials and the like of virtual object and virtual container to the reporting unit 50, the information illustrated in FIG. 7 is stored in the collision information storage unit 48. Meanwhile, a "plastic box (medium)", a "plastic box (large)", and a "metal box (medium)" of FIG. 7 are examples of the material and the like of a virtual container (material and the like of a virtual container which can be stored in the collision condition information storage unit 38) which can be set by a user.

In addition, instead of the examples illustrated in FIGS. 6A and 6B and FIG. 7, the collision information storage unit 48 may store collision information in association with a collision aspect, the material and the like of a virtual object, and a collision speed as illustrated in FIG. 8. The example illustrated in FIG. 8 is an example in which the collision information depends on the collision aspect, the material and the like of a virtual object, and the collision speed. In other words, when the collision information selection unit 44 outputs collision information depending on a collision aspect, the material and the like of a virtual object, and a collision speed to the reporting unit 50, the information illustrated in FIG. 8 is stored in the collision information storage unit 48.

In addition, instead of the examples illustrated in FIGS. 6A and 6B and FIGS. 7 and 8, the collision information storage unit 48 may store collision information in association with a collision aspect, the material and the like of a virtual object, the material and the like of a virtual container, and a collision speed as illustrated in FIG. 9. The example illustrated in FIG. 9 is an example in which the collision information depends on the collision aspect, the materials and the like of a virtual object and a virtual container, and the collision speed. In other words, when the collision information selection unit 44 outputs collision information depending on a collision aspect, materials and the like of a virtual object and a virtual container, and a collision speed to the reporting unit 50, the information illustrated in FIG. 9 is stored in the collision information storage unit 48.

The collision information selection unit 44 acquires determination results of a collision (to the effect that there is collision of a virtual object with an internal wall of a virtual container and to the effect that there is collision of virtual objects with each other) from the collision determination unit 42. Meanwhile, when the collision information selection unit 44 outputs collision information depending on the material and the like of a virtual object to the reporting unit 50, the collision information selection unit acquires the material and the like of a virtual object from the collision determination unit 42. In addition, when the collision information selection unit 44 outputs collision information depending on a material and the like of a virtual container to the reporting unit 50, the collision information selection unit acquires the material and the like of a virtual container from the collision determination unit 42. In addition, when the collision information selection unit 44 outputs collision information based on a collision speed (speed of a collision of the virtual object with the internal wall of the virtual container and speed of a collision of the virtual objects with each other) to the reporting unit 50, the collision information selection unit acquires information indicating a collision speed from the collision determination unit 42.

When the collision information selection unit 44 acquires determination results of a collision and the like from the collision determination unit 42, the collision information selection unit selects collision information to be output to the reporting unit 50 with reference to the collision information storage unit 48.

(Case of Outputting Collision Information Depending on Only Collision Aspect)

When the collision information selection unit 44 has the effect that there is a collision of a virtual object with an internal wall of a virtual container from the collision determination unit 42, the collision information selection unit selects the vibration information "X" which is stored in association with the collision aspect "collision of virtual object with internal wall of virtual container" with reference to the collision information (the collision information storage unit 48) which is illustrated in FIG. 6A.

When the collision information selection unit 44 acquires the effect that there is a collision of virtual objects with each other from the collision determination unit 42, the collision information selection unit selects the sound information "Y" which is stored in association with the collision aspect "collision of virtual objects with each other" with reference to the collision information (the collision information storage unit 48) which is illustrated in FIG. 6A.

(Case of Outputting Collision Information Depending on Collision Aspect and Material and the Like of a Virtual Object)

For example, when the collision information selection unit 44 acquires the effect that there is a collision of a virtual object with an internal wall of a virtual container and the material and the like of a virtual object "metal sphere (small)" from the collision determination unit 42, the collision information selection unit selects vibration information "$X_1$" which is stored in association with the collision aspect "collision of virtual object with internal wall of virtual container" and the material and the like of a virtual object "metal sphere (small)" with reference to the collision information (the collision information storage unit 48) which is illustrated in FIG. 6B.

For example, when the collision information selection unit 44 acquires the effect that there is a collision of virtual objects with each other and the material and the like of a virtual object "metal sphere (small)" from the collision determination unit 42, the collision information selection unit selects sound information "$Y_1$" which is stored in association with the collision aspect "collision of virtual objects with each other" with reference to the collision information (the collision information storage unit 48) which is illustrated in FIG. 6B.

(Case of Outputting Collision Information Depending on Collision Aspect and Materials and the Like of Virtual Object and Virtual Container)

For example, when the collision information selection unit 44 acquires the effect that there is a collision of a virtual object with an internal wall of a virtual container, the material and the like of a virtual object "metal sphere (small)", and the material and the like of a virtual container "plastic box (medium)" from the collision determination unit 42, the collision information selection unit selects vibration information "$X_{11}$" which is stored in association with the collision aspect "collision of virtual object with internal wall of virtual container", the material and the like of a virtual object "metal sphere (small)", and the material and the like of a virtual container "plastic box (medium)" with reference to the collision information (the collision information storage unit 48) which is illustrated in FIG. 7.

For example, when the collision information selection unit 44 acquires the effect that there is a collision of virtual objects with each other, the material and the like of a virtual object "metal sphere (small)", and the material and the like of a virtual container "plastic box (medium)" from the collision determination unit 42, the collision information selection unit selects sound information "$Y_1$" which is stored in association with the collision aspect "collision of virtual objects with each other" and the material and the like of a virtual object "metal sphere (small)" with reference to the collision information (the collision information storage unit 48) which is illustrated in FIG. 7.

(In Case of Outputting Collision Information Depending on Collision Aspect, Material and the Like of a Virtual Object, and Collision Speed)

For example, when the collision information selection unit 44 has the effect that there is a collision of a virtual object with an internal wall of a virtual container, the material and the like of a virtual object "metal sphere (small)", and a speed of collision of virtual object with internal wall of virtual container "$S_A$ ($<S_A 1$)" from the collision determination unit 42, the collision information selection unit selects vibration information "$X_1$-1" which is stored in association with the collision aspect "collision of virtual object with internal wall of virtual container", the material and the like of a virtual object "metal sphere (small)", and the collision speed "less than $S_A 1$" with reference to the collision information (the collision information storage unit 48) which is illustrated in FIG. 8.

For example, when the collision information selection unit 44 acquires the effect that there is a collision of virtual objects with each other, the material and the like of a virtual object "metal sphere (small)", and a speed of collision of virtual objects with each other "$S_B$ ($<S_B 1$)" from the collision determination unit 42, the collision information selection unit selects vibration information "$Y_1$-1" which is stored in association with the collision aspect "collision of virtual objects with each other", the material and the like of a virtual object "metal sphere (small)", and the collision speed "less than $S_B 1$" with reference to the collision information (the collision information storage unit 48) which is illustrated in FIG. 8.

(Case of Outputting Collision Information Depending on Collision Aspect, Materials and the Like of Virtual Object and Virtual Container, and Collision Speed)

For example, when the collision information selection unit 44 acquires the effect that there is a collision of a virtual object with an internal wall of a virtual container, the material and the like of a virtual object "metal sphere (small)", the material and the like of a virtual container "plastic box (medium)", and the speed of the collision of a virtual object with an internal wall of a virtual container "$S_A$ ($<S_A 1$)" from the collision determination unit 42, the collision information selection unit selects vibration information "$X_{11}$-1" which is stored in association with the collision aspect "collision of virtual object with internal wall of virtual container", the material and the like of a virtual object "metal sphere (small)", the material and the like of a virtual container "plastic box (medium)", and the collision speed "less than $S_A 1$" with reference to the collision information (the collision information storage unit 48) which is illustrated in FIG. 9.

For example, when the collision information selection unit 44 acquires the effect that the collision of virtual objects with each other has occurred, the material and the like of a virtual object "metal sphere (small)", the material and the like of a virtual container "plastic box (medium)", and the speed of the collision of virtual objects with each other "$S_B$ ($<S_B 1$)" from the collision determination unit 42, the collision information selection unit selects vibration information "$Y_1$-1" which is stored in association with the collision aspect "collision of virtual objects with each other", the material and the like of a virtual object "metal sphere (small)", and the collision speed "less than $S_B1$" with reference to the collision information (the collision information storage unit 48) which is illustrated in FIG. 9.

The collision information selection unit 44 outputs the collision information selected from the collision information storage unit 48 to the reporting unit 50. Specifically, when the collision information selection unit 44 selects vibration information from the collision information storage unit 48, the collision information selection unit outputs the vibration information to the vibration unit 52, and when the collision information selection unit selects sound information from the collision information storage unit 48, the collision information selection unit outputs the sound information to the sound output unit 54.

Figure 10A:
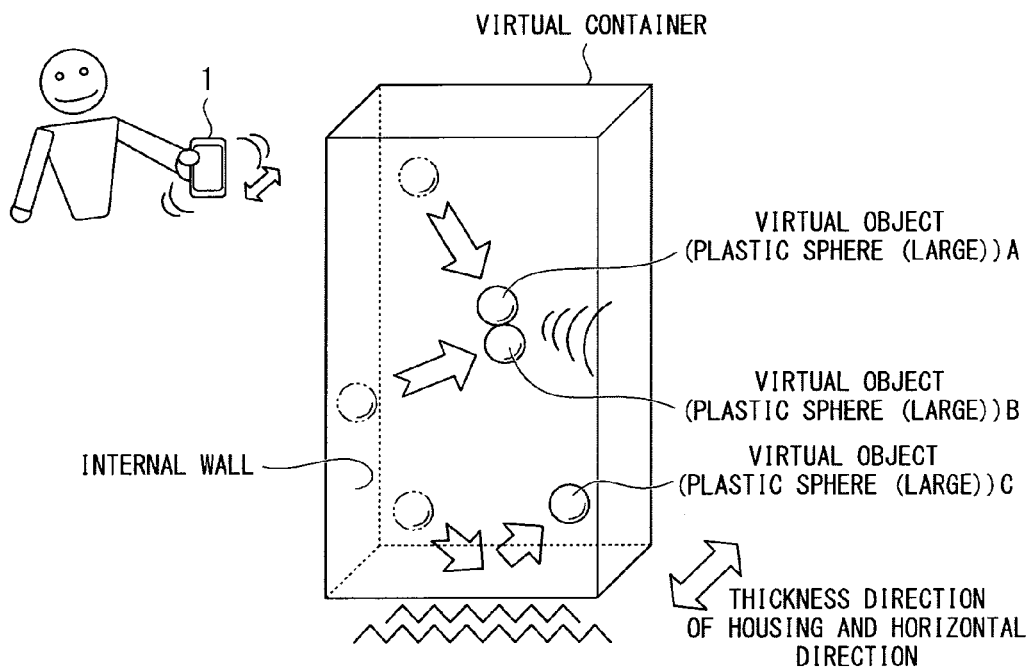
FIG. 10A is a schematic diagram illustrating a sound output or a state of vibration when an electronic device is shaken.
Figure 10B:
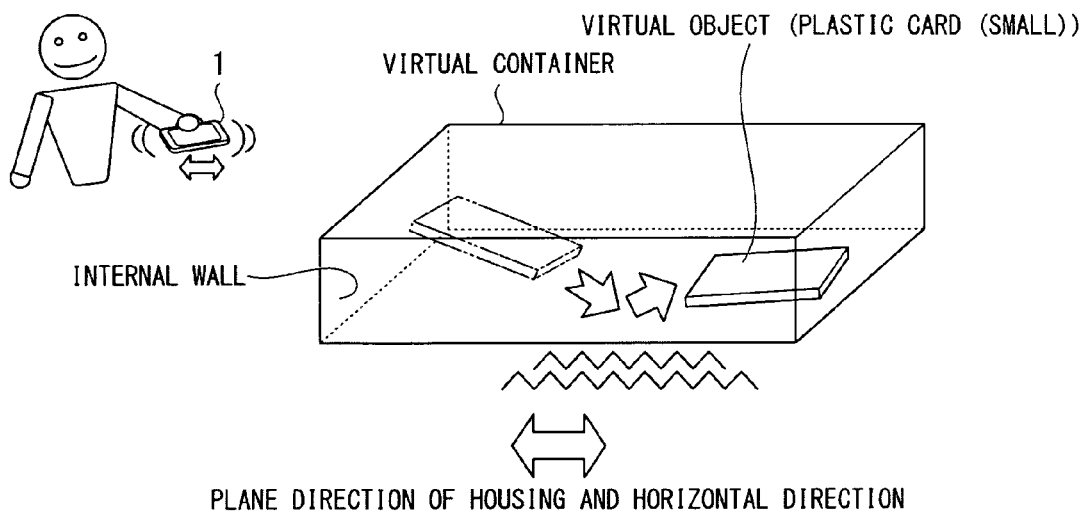
FIG. 10B is a schematic diagram illustrating a sound output or a state of vibration when an electronic device is shaken.

FIGS. 10A and 10B are schematic diagrams illustrating a sound output or a state of vibration when the electronic device 1 is shaken. FIG. 10A illustrates a sound output or a state of vibration in a case of an image storage empty capacity "30%" when a user shakes a housing in a thickness direction of the housing and a horizontal direction in an aspect of selecting a managed object item according to a direction in which the housing is shaken (see FIG. 3B).

That is, when the housing is shaken in the thickness direction and the horizontal direction, the managed object item selection unit 20 selects an image storage empty capacity as a managed object item (see FIG. 3B). Subsequently, the quantity determination unit 34 determines the number of virtual objects "3" corresponding to the image storage empty capacity "30%", and the material determination unit 35 determines a material and the like of a virtual object "plastic sphere (large)" corresponding to the image storage empty capacity "30%" (see FIG. 5C). Subsequently, regarding three plastic spheres (large), the collision determination unit 42 determines a collision of each plastic sphere (large) with an internal wall of a virtual container and a collision of the plastic spheres (large) with each other. Subsequently, when there is a collision of the plastic sphere (large) with the internal wall of the virtual container, the collision information selection unit 44 selects vibration information from the collision information storage unit 48 and outputs the information to the vibration unit 52. When there is a collision of the plastic spheres (large) with each other, the collision information selection unit selects sound information from the collision information storage unit 48 and outputs the information to the sound output unit 54.

The vibration unit 52 vibrates the housing based on the vibration information which is output from the collision information selection unit 44. In other words, the vibration unit 52 vibrates the housing when the plastic sphere (large), which is a virtual object, collides with the internal wall of the virtual container. FIG. 10A illustrates a state where a housing vibrates when a plastic sphere (large) C collides with the internal wall.

The sound output unit 54 outputs a sound (collision sound) to the outside of the housing based on the sound information which is output from the collision information selection unit 44. In other words, the sound output unit 54 outputs a sound when the plastic spheres collide with each other. FIG. 10A illustrates a state where a sound is output when plastic spheres (large) A and B collide with each other.

FIG. 10B illustrates a sound output or a state of vibration in a case of the number of unread e-mails stored "1" when a user shakes a housing in a plane direction of the housing and a horizontal direction in an aspect of selecting a managed object item according to a direction in which the housing is shaken (see FIG. 3B).

That is, when the housing is shaken in the plane direction and the horizontal direction, the managed object item selection unit 20 selects the number of unread e-mails stored as a managed object item (see FIG. 3B). Subsequently, the quantity determination unit 34 determines the number of virtual objects "1" corresponding to the number of unread e-mails stored "1", and the material determination unit 35 determines the material and the like of a virtual object "plastic card (small)" corresponding to the number of unread e-mails stored "1" (see FIG. 5B). Subsequently, the collision determination unit 42 determines a collision of the plastic card (small) with an internal wall of a virtual container and a collision of the plastic cards (small) with each other. Meanwhile, the collision determination unit 42 determines a collision of the plastic cards (small) with each other, but the number of virtual objects is one. Thus, the plastic cards (small) do not collide with each other. Subsequently, when there is a collision of the plastic card (small) with the internal wall of the virtual container, the collision information selection unit 44 selects the vibration information from the collision information storage unit 48 and outputs the information to the vibration unit 52.

When the plastic card (small), which is a virtual object, collides with the internal wall of the virtual container, the vibration unit 52 vibrates the housing. FIG. 10B illustrates a state where a housing vibrates when a plastic card (small) collides with the internal wall.

Figure 11B:
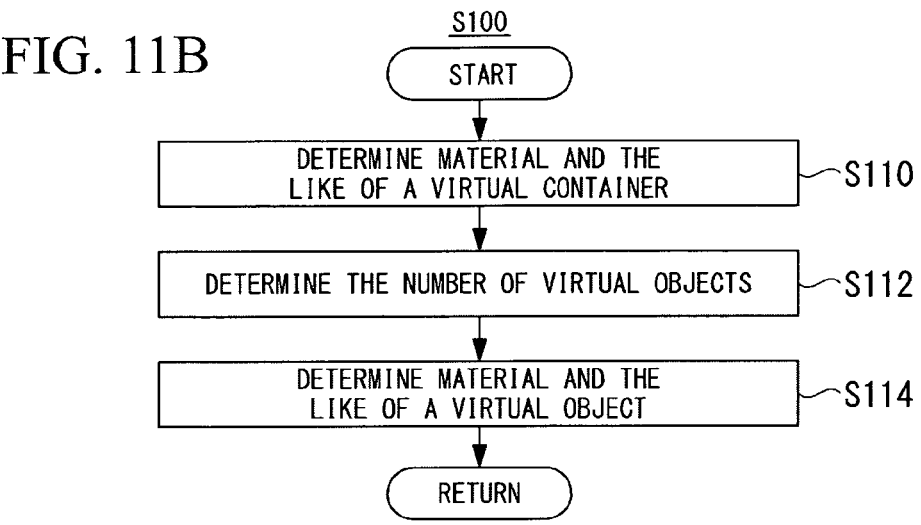
FIG. 11B is an example of a flow chart illustrating a flow of the processing of an electronic device.
Figure 11C:
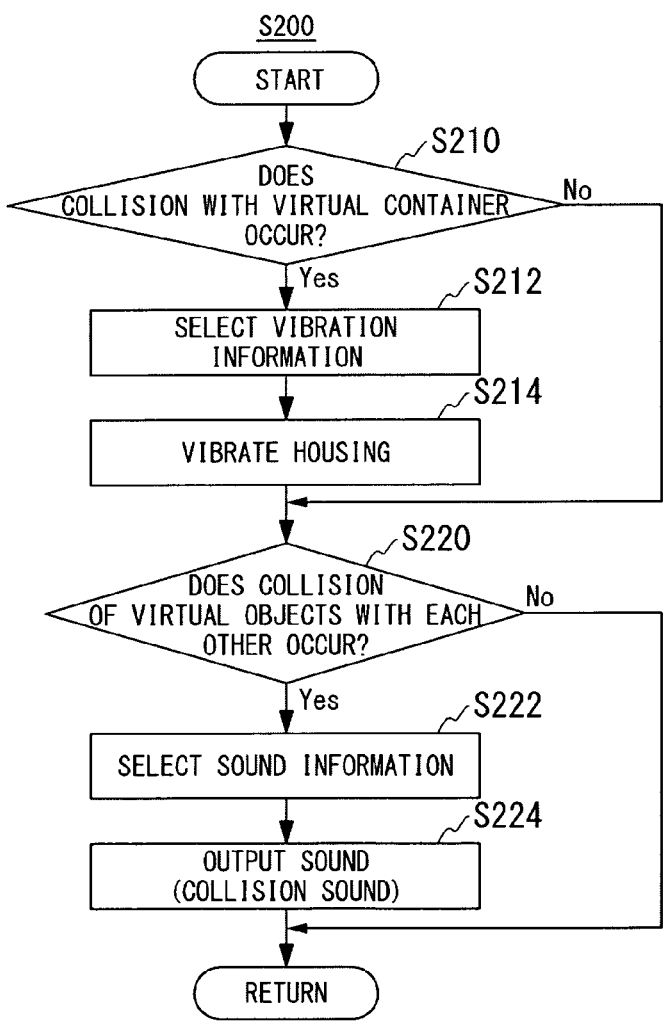
FIG. 11C is an example of a flow chart illustrating a flow of the processing of an electronic device.

FIGS. 11A to 11C are examples of a flow chart illustrating a flow of the processing of the electronic device 1. In the flow charts illustrated in FIGS. 11A to 11C, when the detection unit 10 detects an instruction accompanied by the movement of the housing, a processing aspect is assumed in which the collision information generation unit 40 generates collision information based on the movement (in more detail, a processing aspect in which a managed object item is selected by an instruction accompanied by the movement of the housing and collision information based on a quantity value of the selected managed object item is reported). In addition, the flow charts illustrated in FIGS. 11A to 11C start with setting to an operation mode in which vibration or a collision sound is output by moving a virtual object within a virtual container (hereinafter, referred to as a virtual collision mode), and it is assumed that the managed object item is selected according to the number of times the housing is shaken.

In FIG. 11A, it is determined whether the detection unit 10 detects the movement of the housing (step S10). When the detection unit 10 does not detect the movement of the housing in step S10 (step S10: No), the processing proceeds to step S22.

In contrast, when the detection unit 10 detects the movement of the housing in step S10 (step S10: Yes), the managed object item selection unit 20 counts the number of times the housing is shaken, based on the movement of the housing which is detected in step S10, and selects a managed object item based on the counted number of times shaken with reference to the managed object item storage unit 28 (step S12).

Subsequently to step S12, the collision condition information acquisition unit 30 determines (acquires) collision condition information (a material and the like of a virtual container, the number of virtual objects, and the material and the like of a virtual object) based on the selection result in step S12 with reference to the collision condition information storage unit 38 (step S100). Meanwhile, the processing of step S100 will be described later in detail.

Subsequently to step S100, the collision determination unit 42 calculates the movement of the virtual container and the movement of the virtual object based on the movement of the housing which is detected in step S10 and the collision condition information determined in step S100 (step S14). That is, the collision determination unit 42 calculates the respective movements occurring by the movement of the housing which is detected in step S10, with respect to the virtual container and the virtual object which are specified (determined) by the collision condition information.

Subsequently to step S14, the collision information generation unit 40 generates collision information based on the collision of the virtual object with the internal wall of the virtual container and the collision of the virtual objects with each other, and the reporting unit 50 reports the generated collision information (step S200). Meanwhile, the processing of step S200 will be described in detail.

Subsequently to step S10 (No) or step S200, a termination determination unit, not shown in the drawing, determines whether the virtual collision mode has been terminated (step S20). Meanwhile, it is assumed that the virtual collision mode is terminated by a predetermined operation, a timer, or the like. When the termination determination unit determines that the virtual collision mode has been terminated in step S20 (step S20: Yes), the flow chart illustrated in FIG. 11A is terminated.

When the termination determination unit determines that the virtual collision mode has not been terminated in step S20 (step S20: No), it is determined whether the detection unit 10 detects the movement of the housing, similar to step S10 (step S30). When the detection unit 10 does not detect the movement of the housing in step S30 (step S30: No), the processing returns to step S200.

When the detection unit 10 detects the movement of the housing in step S30 (step S30: Yes), the managed object item selection unit 20 counts the number of times the housing is shaken, based on the movement of the housing which is detected in step S30, similar to step S12 (step S32).

Subsequently to step S32, the collision condition information acquisition unit 30 determines (acquires) collision condition information (the material and the like of a virtual container, the number of virtual objects, and the material and the like of a virtual object) based on the selection result in step S32, similar to step S100 (step S300). Meanwhile, the processing of step S300 is the same as that of step S100 and will be described later.

Subsequently to step S300, the collision determination unit 42 recalculates the movement of the virtual container and the movement of the virtual object based on the movement of the housing which is detected in step S30 and the collision condition information determined in step S300, similar to step S14 (step S34). That is, the collision determination unit 42 recalculates the respective movements occurring by the movement of the housing which is detected in step S30, with respect to the virtual container and the virtual object which are specified (determined) by the collision condition information. Then, the processing returns to step S200.

FIG. 11B is details of step S100 of FIG. 11A. Subsequently to step S12 or step S32 of FIG. 11A, the material determination unit 32 of the virtual container determination unit 31 reads out and acquires a material and the like of a virtual container (information indicating a material and the like) from the collision condition information storage unit 38 (step S110). For example, when the material and the like of a virtual container are stored for each managed object item in the collision condition information storage unit 38, the material determination unit 32 reads out and acquires the material and the like of a virtual container based on a managed object item indicated by the last selection result (the selection result in step S12 during execution subsequent to step S12 of FIG. 11A and the selection result in step S32 during execution subsequent to step S32 of FIG. 11A), from the collision condition information storage unit 38.

Subsequently to step S110, the quantity determination unit 34 of the virtual object determination unit 33 reads out and acquires the number of virtual objects from the collision condition information storage unit 38 (step S112). Specifically, the quantity determination unit 34 reads out and acquires the number of virtual objects based on a quantity value of a managed object item indicated by the last selection result, from the collision condition information storage unit 38.

Subsequently to step S112, the material determination unit 35 of the virtual object determination unit 33 reads out and acquires a material and the like of a virtual object (information indicating a material and the like) from the collision condition information storage unit 38 (step S114). For example, when a material and the like of a virtual object is stored for each managed object item in the collision condition information storage unit 38, the material determination unit 35 reads out and acquires a material and the like of a virtual container based on a managed object item indicated by the last selection result, from the collision condition information storage unit 38. Then, the flow chart illustrated in FIG. 11B is terminated and returns to the flow chart illustrated in FIG. 11A (proceeds to step S14 of FIG. 11A during execution subsequent to step S12 of FIG. 11A and proceeds to step S34 of FIG. 11A during execution subsequent to step S32 of FIG. 11A).

FIG. 11C is details of step S200 of FIG. 11A. Subsequently to step S14 of FIG. 11A, the collision determination unit 42 determines the presence or absence of the collision of the virtual object with the internal wall of the virtual container (step S210). When the collision determination unit 42 does not determine a collision to be present in step S210 (step S210: No), the processing proceeds to step S220.

On the other hand, when the collision determination unit 42 determines a collision to be present in step S210 (step S210: Yes), the collision information selection unit 44 selects vibration information with reference to the collision information storage unit 48 (step S212). Then, the vibration unit 52 vibrates the housing based on the vibration information selected in step S212 (step S214).

Subsequently to step S210 (No) or step S214, the collision determination unit 42 determines the presence or absence of the collision of the virtual objects with each other (step S220). When the collision determination unit 42 does not determine a collision to be present in step S220 (step S220: No), the flow chart illustrated in FIG. 11C is terminated and returns to the flow chart illustrated in FIG. 11A (proceeds to step S20 of FIG. 11A).

On the other hand, when the collision determination unit 42 determines a collision to be present in step S220 (step S220: Yes), the collision information selection unit 44 selects sound information with reference to the collision information storage unit 48 (step S222). The sound output unit 54 outputs a sound (collision sound) based on the sound information selected in step S222 (step S224). Then, the flow chart illustrated in FIG. 11C is terminated and returns to the flow chart illustrated in FIG. 11A (proceeds to step S20 of FIG. 11A).

Meanwhile, the reason to perform step S32 when the detection unit 10 detects the movement of the housing in step S30 of FIG. 11A is that a managed object item may change due to the count-up of the number of times the housing is shaken. In addition, the reason to return to step S200 even when the detection unit 10 does not detect the movement of the housing in step S30 is that a virtual object may be still moving within a virtual housing even though the movement of the housing is not detected (for example, even though the housing stands still or is in a uniform linear motion).

Meanwhile, the managed object item selection unit 20 having selected a managed object item in step S12 or step S32 of FIG. 11A outputs a selection result to the sound output unit 54, and the sound output unit 54 may report the selected managed object item by a sound. In addition, the managed object item selection unit 20 outputs the selection result to the vibration unit 52 instead of or in addition to the sound output unit 54, and the vibration unit 52 may report the selected managed object item by vibration (may vibrate the housing by a vibration method which is determined in advance for each managed object item). The same is true of a flow chart illustrated in FIG. 12 (to be described later).

In addition, when the same managed object item as that of the previous time is selected in step S32, the collision condition information acquisition unit 30 may determine the same collision condition information as that of the previous time in step S300 of FIG. 11A. The same is true of the flow chart illustrated in FIG. 12 (to be described later).

Figure 12:
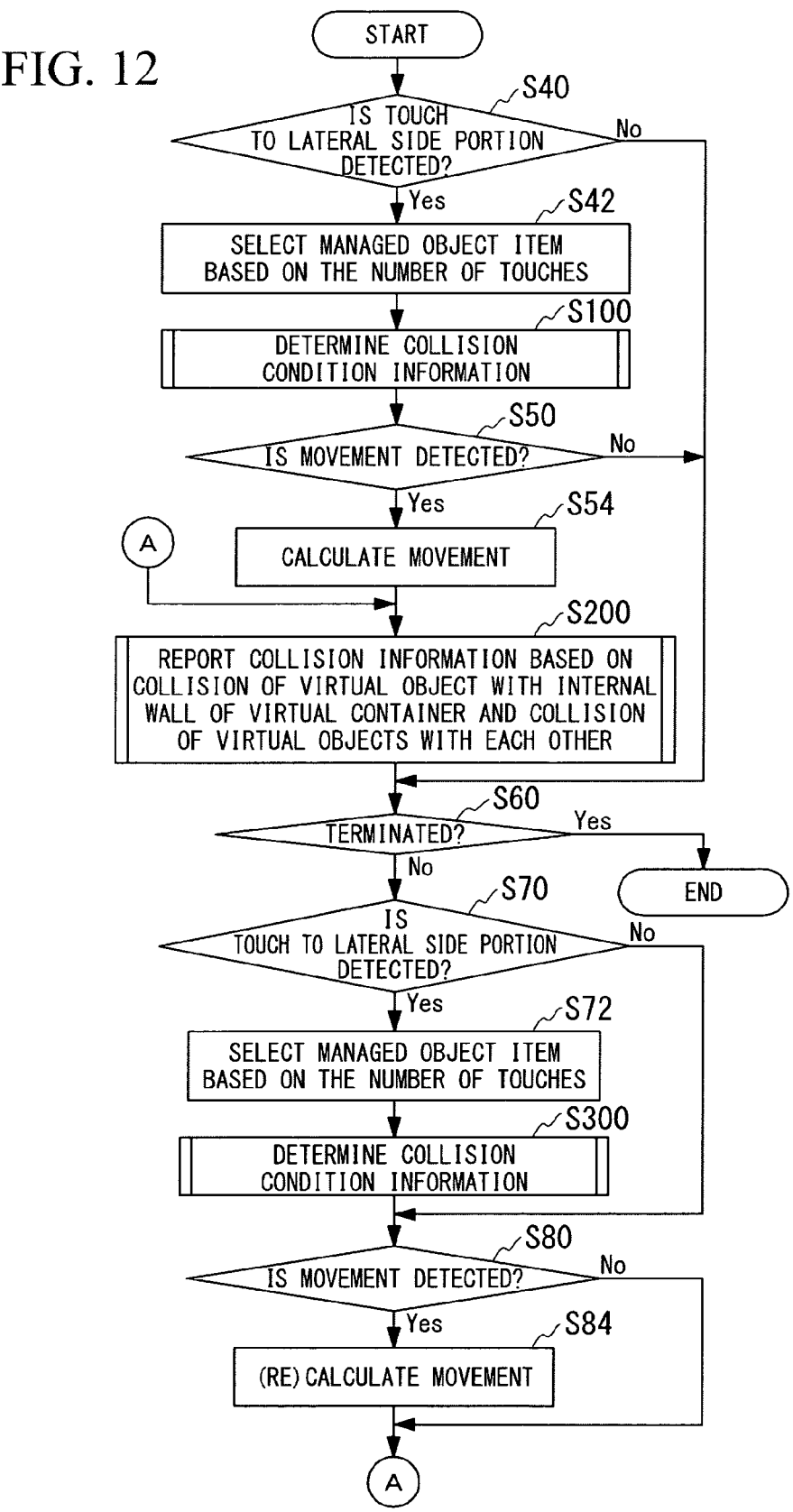
FIG. 12 is an example of a flow chart illustrating another flow of the processing of an electronic device.

FIG. 12 is an example of a flow chart illustrating another flow of the processing of the electronic device 1. In the flow chart illustrated in FIG. 12, in a case where the detection unit 10 detects an instruction unaccompanied by the movement of the housing, when the detection unit 10 further detects an instruction accompanied by the movement of the housing, a processing aspect is assumed in which the collision information generation unit 40 generates the collision information based on the movement (in more detail, a processing aspect in which a managed object item is selected by the instruction unaccompanied by the movement of the housing and then collision information based on a quantity value of the selected managed object item is reported by the instruction accompanied by the movement of the housing). In addition, the flow chart illustrated in FIG. 12 starts with setting to a virtual collision mode, and it is assumed that the managed object item is selected according to the number of touches to the lateral side portion.

In FIG. 12, it is determined whether the detection unit 10 detects a touch (a tap motion, a flicking motion, a sliding motion, or the like) to the lateral side portion of the housing (step S40). When the detection unit 10 does not detect a touch to the lateral side portion of the housing in step S40 (step S40: No), the processing proceeds to step S60.

On the other hand, when the detection unit 10 detects a touch to the lateral side portion of the housing in step S40 (step S40: Yes), the managed object item selection unit 20 counts the number of touches (the number of tapping motions, the number of flicking motions, the number of sliding motions, or the like) which is detected in step S40, and selects a managed object item based on the counted number of touches with reference to the managed object item storage unit 28 (step S42).

Subsequently to step S42, the collision condition information acquisition unit 30 determines (acquires) collision condition information (a material and the like of a virtual container, the number of virtual objects, and a material and the like of a virtual object) based on the selection result in step S42, with reference to the collision condition information storage unit 38 (step S100). Meanwhile, step S100 is similar to step S100 illustrated in FIGS. 11A and 11B, and thus the description thereof will be omitted here.

Subsequently to step S100, it is determined whether the detection unit 10 detects the movement of the housing (step S50). When the detection unit 10 does not detect the movement of the housing in step S50 (step S50: No), the processing proceeds to step S60.

On the other hand, when the detection unit 10 detects the movement of the housing in step S50 (step S50: Yes), the collision determination unit 42 calculates the movement of the virtual container and the movement of the virtual object based on the movement of the housing which is detected in step S50 and the collision condition information detected in step S100 (step S54). That is, the collision determination unit 42 calculates the respective movements occurring by the movement of the housing which is detected in step S50 with respect to the virtual container and the virtual object which are specified (determined) by the collision condition information.

Subsequently to step S54, the collision information generation unit 40 generates collision information based on a collision of the virtual object with the internal wall of the virtual container and a collision of the virtual objects with each other, and the reporting unit 50 reports the generated collision information (step S200). Meanwhile, step S200 is similar to step S200 illustrated in FIGS. 11A and 11C, and thus the description thereof will be omitted here.

Subsequently to step S40 (No), step S50 (No), or step S200, the termination determination unit, not shown in the drawing, determines whether the virtual collision mode has been terminated (step S60).

When the termination determination unit determines that the virtual collision mode has been terminated in step S60 (step S60: Yes), the flow chart illustrated in FIG. 12 is terminated.

When the termination determination unit determines that the virtual collision mode has not been terminated in step S60 (step S60: No), it is determined whether the detection unit 10 detects a touch to the lateral side portion of the housing, similar to step S40 (step S70). When the detection unit 10 does not detect a touch to the lateral side portion of the housing in step S70 (step S70: No), the processing proceeds to step S80.

When the detection unit 10 detects a touch to the lateral side portion of the housing in step S70 (step S70: Yes), the managed object item selection unit 20 counts the number of touches which is detected in step S70 and selects a managed object item, similar to step S42 (step S72).

Subsequently to step S72, similarly to step S100, the collision condition information acquisition unit 30 determines (acquires) collision condition information (a material and the like of a virtual container, the number of virtual objects, and the material and the like of a virtual object) based on the selection result in step S32 (step S300). Meanwhile, the processing of step S300 is the same as that of step S100.

Subsequently to step S70 (No) and step S300, it is determined whether the detection unit 10 detects the movement of the housing, similar to step S50 (step S80). When the detection unit 10 does not detect the movement of the housing in step S80 (step S80: No), the processing returns to step S200.

On the other hand, when the detection unit 10 detects the movement of the housing in step S80 (step S80: Yes), the collision determination unit 42 recalculates the movement of the virtual container and the movement of the virtual object based on the movement of the housing which is detected in step S80 and the collision condition information which is detected just before (collision condition information determined in step S100 or step S300), similar to step S54 (step S84). Then, the processing returns to step S200.

Meanwhile, the reason to perform step S72 when the detection unit 10 detects a touch to the lateral side portion of the housing in step S70 of FIG. 12 is that a managed object item may change due to the count-up of the number of touches. In addition, the reason to return to step S200 even when the detection unit 10 does not detect the movement of the housing in step S80 is that a virtual object may be still moving within a virtual housing even though the movement of the housing is not detected (for example, even though the housing stands still or is in a uniform linear motion).

As described above, according to the electronic device 1, it is possible to roughly confirm a quantity value of a desired managed object item by the sense of hearing (sound) and the sense of touch (vibration) without depending on the sense of sight. In addition, it is possible to switch a desired managed object item to be confirmed, using a simple method (an operation of shaking the housing, a touch to the lateral side portion of the housing, or the like) without depending on the sense of sight.

In the above-described embodiment, a description has been made of an example in which the electronic device 1 outputs vibration information but does not output sound information in a case of the collision aspect "collision of virtual object with internal wall of virtual container". However, in a case of the collision aspect "collision of virtual object with internal wall of virtual container", the electronic device may output sound information in addition to vibration information.

In the above-described embodiment, a remaining battery capacity, the number of unread e-mails stored, an image storage empty capacity, and a remaining time have been described as examples of a managed object item. However, the managed object item may be managed (stored) by the electronic device 1 using a quantity value (digital) and is not limited to the above description. For example, application to the following quantities can be made.

(Physical and Logical Quantity)
The number of e-mails (the number of e-mails transmitted and received (stored), the number of unsent e-mails stored, and the number of e-mails relating to a specific person)
The number of files and folders (the number of pictures (still images), the number of videos, the numbers of pieces of music, albums, and playlists, the number of installed applications, the number of applications currently being executed)
The number of times of access and reproduction (a still image, a video, music, or the like), the number of persons (the number of address book entries registered (mail/phone number and the like)
The number of persons (the number of communicating persons for a predetermined period of time and the number of times of communication relating to a specific person), the number of persons who are present within a predetermined range, the number of persons waiting (at a restaurant, bank, or the like), the capacity, the number of reservations, the number of available persons with respect to a fixed number, and the like
The number of steps (the total number of steps, the number of moving steps, the number of steps remaining, and the like)
The number of entries (the number of address book entries registered, the number of times of alarm setting, the number of memos and scheduled registrations, and the like)
The number of page views on web (including files such as a web page, a video, and music)

(Physical and Logical Amount)
Data size (an e-mail, an image, and the like)
File size
Amount of free disk space
Length of video, music, or the like
The number of pages of a document (the total number of pages, the number of unread pages, and the like)
The number of comments on the Internet (a message board, the number of tweets on Twitter, and the like)
Distance (a total distance, a moving distance, a remaining distance, a distance between an object and a counterpart, and the like)
Speed (a moving speed of a vehicle obtained by the vehicle itself or a measurer, a walking speed, a speed limit, and the like)
Stride length (a current stride length, an aggregated stride length, and the like)
Sojourn time (a sojourn time at a current location)
Tempo (tempo of music, tempo of walking, and the like)
Temperature (a difference between current temperature, water temperature, or the like and preset temperature)
Humidity (a difference between current humidity and preset humidity)
Atmospheric pressure (a difference between current atmospheric pressure and preset atmospheric pressure)
Altitude (a difference between a current altitude (elevation) and a preset altitude)
Wind velocity (a difference between a current wind velocity and a preset wind velocity)
Time (an elapsed time, an exceeded time, an expected time (for example, a time until arrival at the destination and a time until gas runs out, and the like) and the like) and date (including a current date, a preset date, and dates in other time zones)
Age (one's own or target person's age (including an aggregated value), and the like)
The amount of gasoline remaining
The amount of money (price, balance (balance charged on Suica (registered trademark) or the like and a remaining amount up to the credit limit of a credit card) and the like)
Progress (which indicates by % a remaining time of work when "standby" such as, for example, file copying occurs)
Weight (one's own body weight, weight of a measured object (person), and the like)
Receiving sensitivity of electric waves (a current receiving sensitivity and an average receiving sensitivity)
Communication speed of network (a current communication speed, an average communication speed, and the like)

Meanwhile, the above-described "physical quantity" and "physical and logical amount" are classification for convenience. Each quantity value is directly counted or measured by the electronic device 1 and is stored in the electronic device 1 as a managed object item, or is counted or measured by another device, is output to the electronic device 1, and is stored in the electronic device 1 as a managed object item.

In addition, a digitized value is also included in a managed object item of the electronic device 1. Specifically, a value may be digitized and set as a managed object item in order to report a state and a mode of the electronic device 1, an application being executed by the electronic device, and the like. For example, when the electronic device 1 or another electronic device is set to a manner mode, a quantity value is set to "1", and when the electronic device is not set to a manner mode, a quantity value is set to "0". The setting or non-setting of the manner mode may be reported by a sound or vibration. In addition, for example, regarding an application, a correspondence relation between a material of a virtual container, the material of a virtual object, and the number of virtual objects is determined in advance for each combination of applications being executed, and any application being executed may be reported by a sound or vibration.

In the above-described embodiments, a metal sphere (small) and a plastic box (medium) have been described with regard to the material and the like of a virtual object (material, shape, and size) and the material and the like of a virtual container. However, varieties of texture to be reported by a sound or vibration at the time of a collision are as follows.

(Varieties of Texture According to Phenomenon and Situation)

Name card (card): feeling of clattering name cards (card type) in a card case

Confectionery: feeling of jangling and rattling FRISK (registered trademark) and Sakuma drops (registered trademark)

Coins: feeling of jingling coins in a purse or a pocket

Musical instrument: feeling of maracas, a rain stick, or a caxixi being played

Tintinnabulum, bell: feeling of a tintinnabulum, a bell, or the like ringing

Bundle of papers, bundle of bills: for example, feeling of rustling and shaking in a thickness direction (Varieties of Virtual Object Itself)

Ball (plastic sphere, steel ball (pachinko ball or the like), chocolate ball and the like), stone, dice, coin, rubber ball, ping-pong ball, tintinnabulum, wind bell, bell, nut, paper ball, paper strip, card (card, trump, and the like), liquid, liquid+object (pachinko ball in water, water and ice, and the like), confectionery (candy and the like)

(Varieties of Virtual Container Itself)

Slippery texture, rough texture, plastic, metal, paper, stone, rubber, paper (soft paper, fiberboard, cardboard, and the like), object with texture on the surface thereof (cloth, ground, wall, asphalt, satin finished surface, unevenness)

Meanwhile, in the above-described embodiment, "collision of virtual object with internal wall of virtual container" and "collision of virtual objects with each other" are exemplary collision aspects. However, the "collision" also includes a case of rubbing, and a sound and vibration may be changed depending on a collision angle. In addition, a moving sound of a virtual object moving within a virtual container (for example, movement of an object in liquid) is defined, and a sound and vibration may be output.

In addition, the shape of a virtual container is not limited to a cube and a rectangular parallelepiped. For example, the shape may be a spherical shape, a cylindrical shape, a pyramid shape, or other complex shapes (gourd, maze, and the like). In addition, at the time of a collision, gravity applied to a virtual object may be neglected or considered, and gravity values (0G to XG) can be set in the electronic device 1 (physical engine). (Meanwhile, a situation to be reported, such as an increase in the amount of collision with a bottom surface of a virtual container (bottom in a gravity direction), as compared with other surfaces, changes in a case of a large G value).

In addition, as in the description of "liquid+object", a situation (material) within a virtual space is not limited to air/vacuum. In the electronic device 1 (physical engine), a viscosity of a space portion (filling material) within a virtual container can be set. It should be noted that, for example, regarding slow movement underwater, realistic situation may be produced through a change in texture or the like.

In the above-described embodiment, a description has been made of a method of selecting (switching) a managed object item by a touch operation such as tapping, flicking, or sliding with respect to a lateral side portion of a housing (side slider, referred to as "SS"), but the method of selecting a managed object item is not limited thereto. For example, the managed object item may be selected by the following methods.

Operation of SS: grip (the shape of one's grip, right and left, and the number of fingers), body parts striking SS (hand, cheek, elbow, arm, knee, hip, and the like), grip strength (grasping)

Gesture (motion sensor): shaking (including strength, direction, and the number of times), tilting (also including rotation, and including tilting angle and the number of times of tilting), special gesture (drawing a figure, writing a letter, writing a word from letters, and the like)

Operation on touch screen: touch operation, gesture, SYR (sliding on touch surface) operation (including direction and the number of times), operation such as swiping of touch surface, body parts hitting touch surface (hand, cheek, elbow, arm, knee, hip, and the like)

Microphone: sound volume, voice command through voice recognition, identical person authentication through sound (switching every time an identical person is recognized, and the like)

Camera: switching according to subject captured by camera, switching according to the movement of subject captured by camera, results of face recognition (nodding, shaking head, and the like), switching according to situation captured by camera (for example, managed object item A at night (determined from brightness and the like))

Switching according to situations: switching when a certain time elapses, switching when being changed to a certain state (when being at night, when being in the morning, and the like), switching according to temperature and humidity Meanwhile, a program for executing the processes of the electronic device 1 according to the embodiment of the present invention is recorded in a computer readable recording medium, and the program recorded in the recording medium is read by a computer system and is executed, so that the above-described various processes relating to the processes of the electronic device 1 according to the embodiment of the present invention may be performed. Meanwhile, the term "computer system" herein may include hardware such as an OS or peripheral devices. In addition, it is assumed that the "computer system" also includes a homepage providing environment (or a display environment) when a WWW system is used. In addition, the "computer readable recording medium" means a writable nonvolatile memory such as a floppy (registered trademark) disk, a magneto-optical disc, a SD card, or a flash memory, portable mediums such as a CD-ROM, and storage devices such as a hard disk built in the computer system.

Further, it is assumed that the "computer readable recording medium" also includes mediums that hold a program for a certain period of time like a volatile memory (for example, dynamic random access memory (DRAM)) inside a computer system serving as a server or a client in a case where a program is transmitted through networks such as the Internet or communication lines such as a telephone line. In addition, the above-described program may be transmitted from a computer system having the program stored in a storage device through a transmission medium, or through transmitted waves in the transmission medium, to another computer system. Here, the "transmission medium" that transmits a program means mediums having a function of transmitting information like networks (communication networks) such as the Internet or communication lines (communication wires) such as a telephone line. In addition, the above-mentioned program may be a program for realizing a portion of the above-mentioned functions. Further, the above-mentioned program may be a so-called difference file (difference program) capable of realizing the above-mentioned functions by a combination with a program which is already recorded in a computer system.

Although the embodiment of the present invention has been described so far with reference to the accompanying drawings, a specific configuration is not limited to the embodiment and also includes designs without departing from the scope of the present invention.

What is claimed is:

1. An electronic device comprising:
    a detection unit that detects movement of at least a housing;
    an information generation unit that generates sound information based on a quantity value of a predetermined managed object item and the movement of the housing which is detected by the detection unit; and
    a sound output unit that outputs a sound based on the sound information.

2. The electronic device according to claim 1, further comprising:
    a storage unit that stores instruction information indicating a predetermined instruction detected by the detection unit in association with the managed object item; and
    a selection unit that selects the managed object item corresponding to the instruction information indicating the instruction when the detection unit detects the instruction,
    wherein the information generation unit generates the sound information based on the quantity value of the managed object item selected by the selection unit and the movement of the housing which is detected by the detection unit.

* * * * *